(12) United States Patent
Geiser et al.

(10) Patent No.: US 6,708,055 B2
(45) Date of Patent: Mar. 16, 2004

(54) METHOD FOR AUTOMATED ANALYSIS OF APICAL FOUR-CHAMBER IMAGES OF THE HEART

(75) Inventors: Edward A. Geiser, Gainesville, FL (US); David C. Wilson, Gainesville, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 10/138,526

(22) Filed: May 6, 2002

(65) Prior Publication Data

US 2003/0153823 A1 Aug. 14, 2003

Related U.S. Application Data

(62) Division of application No. 09/139,688, filed on Aug. 25, 1998, now abandoned.

(51) Int. Cl.$^7$ .................................................. A61B 5/05
(52) U.S. Cl. ................................................... 600/425
(58) Field of Search ............................. 600/407–450

(56) References Cited

U.S. PATENT DOCUMENTS

| | | | | |
|---|---|---|---|---|
| 4,101,961 A | * | 7/1978 | Fletcher et al. |
| 4,720,870 A | * | 1/1988 | Billiotte et al. |
| 4,907,156 A | * | 3/1990 | Doi et al. |
| 4,936,311 A | * | 6/1990 | Oe |
| 5,056,024 A | * | 10/1991 | Stuyts |
| 5,107,838 A | * | 4/1992 | Yamaguchi |
| 5,257,624 A | * | 11/1993 | Fraser et al. |
| 5,322,067 A | * | 6/1994 | Prater et al. |
| 5,360,006 A | * | 11/1994 | Geiser et al. |
| 5,431,161 A | * | 7/1995 | Ryals et al. |
| 5,734,739 A | * | 3/1998 | Sheehan et al. |
| 5,797,396 A | * | 8/1998 | Geiser et al. |
| 5,871,019 A | * | 2/1999 | Belohlavek |

FOREIGN PATENT DOCUMENTS

| | | | |
|---|---|---|---|
| FR | 2583547 | * | 12/1986 |
| WO | WO 91/19457 | * | 12/1991 |
| WO | WO 94/05288 | * | 3/1994 |
| WO | WO 96/41312 | * | 12/1996 |

OTHER PUBLICATIONS

Adams et al., "semiautomated border tracking of cine echocardiogram ventricular images," IEEE Transactions on Medial Imaging, MI-6(3), 1987.

Blokland et al., "Delineating elliptical objects with an application to cardiac scintigrams," IEEE Transactions on Medial Imaging, MI-6(1):57–66, 1987.

Bosch et al., "Automated endocardial contour detection in short-axis 2-D echocardiograms: methodology and assessment of variability," In: Proc. 15$^{th}$ Conf. Comput. in Cardiol., 137–140, 1988.

Bosch et al., Evaluation of a semiautomatic contour detection approach in sequences of short-axis two-dimensional ecocardiographic images, J. Am. Soc. Echocardiogr., 8:810–821, 1995.

(List continued on next page.)

*Primary Examiner*—Scott M. Getzow
(74) *Attorney, Agent, or Firm*—Miles & Stockbridge P.C.; Dennis P. Clarke

(57) ABSTRACT

A method for quantitatively analyzing digital images of approximately elliptical body organs, and in particular, echocardiographic images is provided. In particular, methods are disclosed for obtaining short-axis apical four-chamber views of a heart, and particularly for obtaining high-quality automated images of particular regions of the heart muscle, as viewed along its long axis.

16 Claims, 4 Drawing Sheets

OTHER PUBLICATIONS

Chalana et al., "A multiple active contour model for cardiac boundary detection on echocardiographic sequences," IEEE Trans. Med. Imag., 15:290–98, 1996.

Christiansen et al., Physical and biochemical characterization of Albunix™, a new ultra–sound contrast agent consisting of air filled albumin microspheres suspended in a solution of human albumin, Biotechnol. Appl. Biochem., 19:307–20, 1994.

Chu et al., "Detecting left ventricular endocardial and epicardal boundaries by digital two dimensional echocardiography," IEEE Transactions on Medial Imaging, 7(2):81–90, 1988.

Conetta et al., "Reproducibility of Left Ventricular Area and Volume Measurements Using a Computer Endocardial Edge Detection Algorithm in Normal Subjects," American Journal Cardiology, 56:947–952, 1985.

Detmer et al., "Marched filter identification of left–ventricular endocardial borders in transesophageal echocardiograms", IEEE Transactions on Medical on Medical Imaging, 9(4):396–403, 190.

Dias and Leitao, Wall position and thickness estimates from sequences of echocardiographic images, IEEE Trans. Med. Imag., 15:25–38, 1996.

Feignbaum, "The echocardiographic examination," In: Echocardiography, 5$^{th}$ Edition, 5$^{th}$ Edition, Lea & Febiger, Philadelphia, pp. 68–72, 77–78,1994.

Friedland et al., "Automatic ventricular cavity boundary detection from sequential ultrasound images using simulated annealing," IEEE Transactions on Medial Imaging, 8(4):344–353, 1989.

Gasull et al., "Automatic left ventricular contour extraction for volume calculation from echocardiographic images," Ultrasonics International 1989 Conferences Proceedings, pp. 1173–1178,1989.

Geiser et al., "Autonomous epicardial and endocardial boundary detection in echocardiographic short–axis images," J. Am. Soc Echocardiography, 11(4):338–348, 1998.

Geiser, et al., "A Second–generation computer–based edge detection algorithm for short–axis, two–dimensional echocardiographic images: Accuracy and Improvement in Interobserver Variability", J. Am. SOc. Echocardiogr., 3(2):79–90, 1990.

Geiser et al., "Applications of cross–correlation techniques to the quantiation of wall motion in short–axis two–dimensional echocardiographic images," J. Am. Soc. Echocardiogr., 3(4):266–275, 1990.

Geiser et al., "A method for evaluation of enhancement operations in two–dimensional echocardiographic images," J. Am. Soc. Echo., 4:235–246, 1991.

Geiser et al., "Clinical validation of an edge detection algorithm for two dimensional echocardiographic short axis images," J. Am. Soc. Echocardiogr., 1(6):410–421, 1988.

Geiser et al., "Evidence for a relation between inspired gas mixture and the left ventricular contrast achieved with Albunex® in a canine model," Clin. Cardiol., 19:289–295, 1996.

Geiser, "Applications of automatic edge detection and image enhancement techniques to two–dimensional echocardiography and coronary disease," In Echocardiography in Coronary Artery Disease, Kerber, Ed., Futura Publishing Co., Inc., Mount Kisco, New York, Chapter, pp. 483–508, 1988.

Geny et al., "Safety and Efficacy of a New Transpulmonary Echo Contrast Agent in Echocardiographic Studies in Patients," J. Am. Col. Cardiol., 22(4):1193–1198, 1993.

Han et al., Knowledge–based image analysis for automated boundary extraction of transesophageal echocardiographic left–ventricular images, IEEE Trans. Med. Imag., 10:602–610–1991.

Henry et al., "Parasternal short axis view: left ventricle," Report of the American Society of Echocardiography Committee on nomenclature and Standards, Nov., 1982.

Hunter et al., "Fully automatic ventricular boundary extraction in echocardiographic images," IEEE Computers in Cardiology, pp. 741–744, 1995.

Kaneko et al., "Straight–line approximation for the boundary of the left ventricular chamber from a cardiac cineangiogram," IEEE Transactions on Biomedical Engineering, BME–20(6):413–416, 1972.

Karras et al., "Automatic identification of papillary muscles in left–ventricular short–axis echocardiographic images," IEEE Transactions on Biomedical Engineering, 43(5):460–470, 1996.

Kaul, "Myocardial Contrast Echocardiography in Coronary Artery Disease: Potential Applications Using Venous Injections of Contrast," Am. J. Cardiol., 61D–68D, 1995.

McEachen et al., "Shape–Based Tracking of naturally Occurring Annuli in Image Sequences", Computer Vision and Pattern Recognition '93, New York, New York, 1993.

Melton et al., "Rational–gain–compensation for attenuation in ultrasonic cardiac imaging," Ultrasonics Symposium, pp. 607–611, 1981.

Meyer et al., "Estimation of ultrasonic attenuation and mean back–scatterer size via digital signal processing," Ultrasonic Imaging, 6:13–23, 1984.

Monaghan et al., "Digital radio frequency echocardiography in the detection of myocardial contrast following intravenous administration of Albunex," Heart., 14(9):1200–1209, 1993.

Nitzan et al., "Comparison of geometric and densitometric techniques for the measurement of left ventricular volume changes," Proceedings of the Conference on Computers on Cardiology, Sep. 19–22, 1989; Jerusalem, Israel; IEEE Computer Society Press, Washington (U.S.), pp. 389–391, 1989.

Parker et al., "Application of Point Distribution Models to the Automated Analysis of Echocardiograms", IEEE Computers in Cardiography, pp. 25–28, 1994.

Perez et al., "On–line assessment of ventricular function by automatic boundary detection and ultrasound imaging," J. Am. Coll. Cardiol., 19:313–320, 1992.

Prasad and Srinivasan, "An image processing method for cardiac motion analysis," IEEE Trans. Biomed. Eng., BME—34(3):244–247, 1987.

Pratt, In: Digital Image Processing, John Wiley & Sons, New York, p. 566, 1978.

Rosenfeld and Kak, "Mathematical preliminaries," In: Digital Picture Processing, Second Edition, vol. 1, Academic Press, New York, Chapter 2, pp. 10–13, 1982.

Rosenfeld and Kak, "Matching," In: Digital Picture Processing, Second Edition, vol. 2, Academic Press, New York, Chapter 9, pp. 10–11, 36–46, 1982.

Stewart, In: Clinical Anatomy and Physiology for the Frustrated Health Professional, MedMaster, Inc., Miami, pp. 5, 113–120, 1986.

Torres et al., "A new algorithm for automatic border detection of two-dimensional echocardiographic images. Time-varing image processing and moving object recognition," Elsevier Science Publishers, B.V., pp. 181–188, 1990.

Uchiyama et al., Comparison of manual and computer-assisted automatic measurements of wall thickness of the left ventricle in two-dimensional echocardiography, Jap. Circ. J., 58:49–56, 1994.

van der Geest et al., "Automated detection of left ventricular epi- and endocardial contours in short-axis MR images," IEEE Computers in Cardiology, pp. 33–36, 1994.

Vandenberg et al., "Estimation of left ventricular cavity area with an on-line, semiautomated echocardiographic edge detection system," Circulation, 86:159–166,1992.

Weyman, In: Principles and Practice of Echocardiography, Second Edition, Lea & Febiger, Philadelphia, pp. 109–110, 1994.

Wible et al., "Inhaled gases affect the ultrasound contrast produced by Albunex® in anesthetized dogs," J. Am. Soc. Echocardiogr., 9:442–451, 1996.

Wible et al., "Improving the sonographic contrast produced by Albunex™ during the inhalation of gases other than air" Acad. Radiol., 3 Suppl. 2:S317–S319, 1996.

Wilson, et al., "Automatic center point determination in two-dimensional short-axis echocardiographic images", Pattern recognition, 25(9):893–900, 1992.

Wilson, et al., "Feature extraction in two-dimensional short-axis echocardiographic images", Journal of Mathematical Imaging and Vision, 3:285–298, 1983.

Wilson, et al., "The use of matched filters for extraction of left ventricular features in 2-dimensional short-axis echocardiographic images," In: Mathematical Methods in Medical Imaging, SPIE, 1768:37–49, 1992.

Wilson et al., "An automatic algorithm for analysis of 2-D echocardiographic short-axis images: a brief overview," IEEE Transac. Biomed. Eng., 222–231, 1996.

Zhang and Geiser, "An effective algorithm for extracting serial endocardial borders from two-dimensional echocardiograms," IEEE Trans. Biomed. Eng., BME–31(6):441–447, 1984.

* cited by examiner

METHOD FOR AUTOMATED ANALYSIS OF APICAL FOUR-CHAMBER IMAGES OF THE HEART

This is a Divisional of application Ser. No. 09/139,688 filed Aug. 25, 1998 now abandoned.

The United States government has certain rights in the present invention pursuant to grant number HL35927 from the National Institutes of Health.

1.0 BACKGROUND OF THE INVENTION

1.1. Field of the Invention

The invention concerns systems for automatically analyzing echocardiographic digital images of the heart, especially two-dimensional images acquired using apical four-chamber view of the heart. The systems preferably employ a collection of matched filters on the images to automatically locate and measure features of the heart.

1.2. Description of Related Art

Two-dimensional ultrasonic imaging is used as an important non-invasive technique in the comprehensive characterization of a number of body organs. In ultrasonic imaging, a sound pulse is sent along a ray from a transducer towards the organ that is being imaged. The pulse is attenuated and reflected when it hits a medium with an acoustic impedance different from that of the medium in which the pulse is traveling. The time the sound pulse takes in transit is a measure of the distance of the medium interface from the transducer. The amount of energy that is reflected is a measure of the difference in acoustic impedance across the interface. Since the energy of the pulse diminishes as it travels, post-processing of the reflected signal includes time/gain control that compensates for the attenuation of the signal over time. Assuming the pulse travels at a single speed in the body, and by taking rays uniformly distributed across a given plane, a two-dimensional record of the received energy in spatial (Cartesian, polar) coordinates can be used to present a cross-sectional view of the imaged organ.

Echocardiography is the application of ultrasonic imaging to the heart. Echocardiography has experienced widespread acceptance in the evaluation of cardiac disease, structure, and function of the heart. This acceptance is in large part due to its non-invasive nature, and to its real-time capability for observing both cardiac structure and motion. Using echocardiography, quantitative information may be obtained concerning cardiac anatomy, chamber diameter and volume, wall thickness, valvular structure, ejection fraction, etc. (Weyman, 1994).

The real-time capability of echocardiography may be used to measure variations in the shape of heart structures throughout the cardiac cycle (Weyman et al., 1984). These analyses require the complete determination of inner (endocardial) and outer (epicardial) boundaries of the heart wall, particularly of the left ventricle. Present evidence indicates that sensitive detection of ischemic disease with two-dimensional echocardiography requires knowledge of the endocardial border on echocardiographic frames throughout the cardiac cycle (Weyman et al., 1984).

Because both global and regional left ventricular function are major variables used to determine prognosis in cardiac disease, there is considerable interest in the ability to quantify function indexes from echocardiographic images. Presently, such indexes, e.g., left ventricular chamber volume and left ventricular ejection fraction, are calculated from observer-defined cardiac boundaries traced with either a light pen, a digitizing tablet, or either a mouse, trackball, or other suitable computer input device. Tracing of endocardial borders on two-dimensional echocardiograms, however, is tedious and the selected borders may be highly subjective. Indeed, in most systematic studies, substantial intra-observer and inter-observer variability has been found in such observer-defined cardiac boundaries (Weyman et al., 1984). An echocardiogram is a generic term for an image formed using ultrasound. It contrasts with images produced by x-ray, magnetic resonance, or other techniques (which are typically referred to as "radiologic medical tomographic images"). An echocardiogram may also be referred to as a "sonogram," and is an image that is formed using ultrasound as the type of wave producing the images.

One advantage of ultrasound (sonograms) as an image formation technique, is that images can be formed very rapidly, meaning typically 10 to possibly 80 times per second, therefore, since the heart has one beat per cycle, it is feasible to catch up to typically 30 to 50 images in this series through one heart cycle. The registration point moves, or at least can move on every frame and therefore, in both the short axis and the long axis, the inventors have elected to locate that point on each frame. It can not be assumed to stay fixed. Measurements may be made on each frame (i.e. a single image from a series of images) and adjusted to the size of the heart by taking into account the scale factor of the image; in other words, how many pixels represent a centimeter can be changed by the operator. The scale factor relating the number of pixels in one centimeter in the image must be known so that the measurements can be adjusted to the true size of the heart. The "registration point" is the origin of the system of coordinates.

Manually defining such boundaries becomes increasingly labor intensive when the analysis of a complete cardiac cycle is needed to provide a description of the systolic and diastolic wall motion pattern, or when a number of echocardiographic frames have to be processed in order to obtain an extended time-history of cardiac function. It is therefore desirable to automate as much as possible the determination of boundaries of echocardiographic images, as well as other structural features. Automated definition of the boundaries and features would improve the reliability of analyses by eliminating the subjectivity of manual tracing.

In the past several years, advances in computer data processing technology have allowed the application of several different automatic boundary detection methods to echocardiographic images (Conetta et al., 1985). However, most researchers have had difficulties with image enhancement and boundary detection with echocardiographic images because of the low signal-to-noise ratio and large discontinuities in such images. Thus, automated border detection has been reported in two-dimensional echocardiographic images, but only when the images have been of good quality and certain smoothing techniques have been employed prior to edge detection in order to render the endocardial edge more continuous. An overview of the field is set forth in Kerber (1988).

U.S. Pat. No. 5,797,396 to Geiser and Wilson (1998) (specifically incorporated herein by reference in its entirety) describes a method for the automated analysis of short-axis views of a heart.

1.3 Deficiencies in the Prior Art

What is lacking in the prior art is a method for automatically determining quantitative characteristics of ultrasonic images, especially long-axis echocardiographic images that provide details of the apical four-chamber view of a heart. In particular, there is also a need for a method that can automatically determine key regions of an imaged structure and approximate the borders of such a structure.

2.0 SUMMARY OF THE INVENTION

The present invention is directed at making automated measurements on echocardiographic 2-D images acquired using the apical 4-chamber view. In a broad aspect, the invention comprises a system for processing 2-D digital images of the heart to analyze the structure and functioning of the heart. These features include the right and left ventricles, the septum, the mitral valve apparatus and the myocardium.

The invention provides a method for automatically analyzing a long-axis image of a heart, the method comprising the steps of: (a) generating an image frame of the myocardium, interventricular septum, and mitral valve annulus of the heart, the image frame comprising a plurality of rows and a plurality of columns of pixels in a digital format; (b) determining an approximate position of the interventricular septum from the diagnostic image comprising: (i) passing a filter through the image to determine a maximum mean pixel intensity, wherein the maximum is a first approximate position of the interventricular septum; (ii) defining a second approximate position of the interventricular septum with a series of straight line filters; (iii) obtaining a best fit line through the second approximate position from the upper portion of the series of straight line filters; (c) determining an approximate position of a medial border of the mitral valve annulus by passing a right-angle filter down the best fit line determined from step (b)(iii) until a maximum mean pixel intensity is determined, wherein the maximum is indicative of the approximate position of the mitral valve annulus; (d) defining a registration point as the point at which the best fit line intersects the approximate position of the mitral valve annulus; (e) locating one or more regions of the myocardium in relation to the registration point; and (f) calculating the mean pixel intensity in each of the regions of the myocardium, wherein the mean pixel intensity provides an analysis of the long axis image of the heart.

In certain preferred aspects of the present invention, the image is generated by ultrasound, X-rays, such as planar X-rays or tomographic X-rays, or magnetic resonance imaging. In a particularly preferred embodiment of the invention, the image is generated by ultrasound.

In particular embodiments, the filter is a large mean, first derivative, or second derivative filter. In other aspects of the invention, the series of straight line filters comprises one or more Laplacian or first derivative filters, and in preferred embodiments, the series of straight line filters comprises about 32 Laplacian filters.

In certain aspects of the invention, the regions of the myocardium are selected manually for densitometry over a coronary perfusion bed, while in other aspects, the regions of the myocardium are selected automatically for densitometry.

The invention also provides a method for determining the optical density of a digital image of an apical view of a heart, the method comprising the steps of: (a) obtaining a control frame from a baseline period prior to injecting a contrast agent; (b) determining a first registration point in the image; (c) locating one or more regions of a myocardium in relation to the registration point on the control frame; (d) calculating the mean pixel intensity of the one or more regions of the myocardium; (e) injecting the contrast agent and obtaining a sequence of frames; (f) determining a second registration point in one or more of the frames of the sequence; (g) locating one or more regions of the myocardium on one or more of the frames corresponding to the regions of a control frame; (h) calculating the mean pixel intensity of the one or more regions of the myocardium in one or more of the frames of the sequence; and (i) obtaining a time-mean pixel intensity curve by comparing the mean pixel intensity for the frames following injection of the contrast agent to the control frame, wherein the time-mean pixel intensity curve determines the optical density of the digital image in a selected region of the apical long axis view of the heart.

In certain aspects of the invention, the method further comprises the step of determining whether perfusion is present in a region by comparing a pre-contrast mean pixel intensity to that calculated after peripheral injection. Preferred contrast agents for use in the present invention include, but are not limited to, Albunex® or Optison®.

The present invention further provides a method for automatically locating an approximate position of the interventricular septum of a heart in a long-axis image, the method comprising the steps of generating an image frame of the heart, the image frame comprising a plurality of rows and a plurality of columns of pixels in a digital format, and passing a filter through the image to determine a maximum mean pixel intensity, wherein the maximum is an approximate position of the interventricular septum in the image. In particular aspects, the method further comprises passing a series of straight line filters through the image.

The invention also provides a method of automatically locating an approximate position of a medial border of a mitral valve annulus in a long-axis diagnostic image of a heart, the method comprising the steps of: (a) generating an image frame of the interventricular septum and mitral valve annulus of the heart, the image frame comprising a plurality of rows and a plurality of pixels in a digital format; (b) determining an approximate position of the septum from the diagnostic image comprising: (i) passing a filter through the image to determine a maximum mean pixel intensity, wherein the maximum is a first approximate position of the interventricular septum; (ii) defining a second approximate position of the interventricular septum with a series of straight line filters; (iii) obtaining a best fit line through the second approximate positions from the upper portion of the series of straight line filters; and (c) determining an approximate position of a medial border of the mitral valve annulus by passing a right-angle filter down the best fit line determined from step (b)(iii) until a maximum mean pixel intensity is determined, wherein the maximum is indicative of the approximate position of the mitral valve annulus.

Additionally, the present invention provides a method of screening a compound for use as a contrast agent in echocardiography, the method comprising the steps of: (a) obtaining, from a baseline period prior to injecting the compound, a control frame of a digital image of an apical long-axis view of a heart; (b) determining a first registration point in the image; (c) locating one or more regions of a myocardium in relation to the registration point on the control frame; (d) calculating the mean pixel intensity of the one or more regions of the myocardium; (e) injecting the compound and obtaining a sequence of frames; (f) determining a second registration point in the frames; (g) locating one or more regions of the myocardium on the frame corresponding to the regions of the control frame; (h) calculating the mean pixel intensity of the one or more regions of the myocardium in the frame; and (i) obtaining a time-mean pixel intensity curve by comparing the mean pixel intensity for the frame following injection of the contrast agent to the control frame, wherein an increase in the mean pixel intensity in the regions of the myocardium in the frame following injection of the contrast agent over the control frame is indicative of injection of a contrast agent.

In a most general sense, the algorithm concerns: (a) identification of the sector scan; (b) finding vertical line through the middle of the LV chamber (i.e. through the low intensity (or dark) pixels on the right side of the image). This method uses all of the frames in the sequence between ED and ES. The purpose of these steps is to limit the region of computation for the septum. If this step is omitted, the septum is sometimes found too far to the right on the free wall of the RV; (c) finding the location and computing the slope of the septum; (d) locate the left side of the mitral valve ring (i.e. the medial MV) using a matched filter designed using a meaned first derivative in the vertical direction; (e) locate the right side of the mitral valve ring (i.e. the medial Mv) using a matched filter designed using a meaned first derivative in the vertical direction; (f) compute the location of the apex using a matched filter designed form a meaned first derivative; (g) compute border points of the septum; and (h) compute border points of the free wall (i.e. right side of LV).

The most important boundaries sought are the boundaries of the myocardium, that is the endocardium or boundary of the inner lining of the heart and the epicardium, which, in this case, is considered the lining of the right side of the septum and true epicardium on the apex, inferior, and lateral walls. These are shown, and identified in FIG. 1.

An important piece of information that may be extracted from an apical views of a heart is the length of the left ventricle; in other words, the distance from the mitral valve plane to the apex, as well as the diameters. This allow a calculation of volume and estimation of ejection fraction (or fractional ejection of blood volume over time) which is a measure of the global function of the heart. In addition, if the entire inner lining of the heart(endocardium) is identified by this method then motion of individual portions of the wall over time can be mapped. This allows the particular features related to abnormal motions, such as with a heart attack, to be located and measured for the percentage of heart muscle involved.

In one broad method embodiment of the invention, a 2-D, long axis, ultrasonic image of the heart is filtered to identify selected features—notably the septum and the medial border of the mitral valve annulus. These two features intersect at right angles and provide a useful point for locating and orienting these and other features and functions of the heart. Thus, this registration point serves as the origin of a system of coordinates for defining the location of pixels and structural features in the image of the heart. The image typically comprises rows and columns of pixels in a digital format with the registration point as a reference point for the rows and columns.

Filtering and digital imaging is performed by passing what is referred to as a "kernel" over every pixel in the image to obtain a resulting image, as described in U.S. Pat. No. 5,797,396. While all filters will have a maximum and minimum value resulting from the kernel, what may be important at the time may be the maximum value, the minimum value, or even which pixels are zero after the filter is passed through the image. The filters provide a digital number as the output, the person designing the algorithm decides whether it is important to seek the maximum, the minimum, the zero crossings, or some other level of output from the filters. The inventors believe that a more generic term for filters would be convolutions. In general, all of the filters in the disclosed processes are referred to as adaptive, meaning that some features of the image as it is calculated actually determine the size and shape of the filters in the next step.

The "long axis" refers to an image of the heart which visualizes structures in a plane parallel to the longitudinal axis; in other words, the axis extending from the apex or tip of the heart to the base, which can include the aorta and posterior portions of the left and right atrium. While a parastemal long axis view can be obtained (that is a view from along side the sternum) a preferred long axis view in the present invention is the apical long-axis view; a view which is taken typically from the 5th or 6th intercostal space near the anterior axillary line and is taken from that position on the lateral chest aiming back towards the base of the heart. The typical orientation is then one where the apex of the heart is near the apex of the sector scan with the left ventricle to the left, right ventricle to the right and then posterior to these, near the bottom of the scan, the left atrium again in the left posterior portion and the right atrium in the fight posterior portion of the scan. In a preferred long axis view, the long axis passes through the epicardial apex. It is realized by echocardiographers, however, the probe or ultrasound transducer can frequently not be placed in a position to achieve this. What is expected as the best possible position which maximizes the long axis length of the left ventricle; that is, the distance from the epicardial apex to the mitral valve plane.

Typically such a view determined, by placing the transducer on the chest wall in an intercostal space closest to the apex of the heart and then aimed in a direction towards the mid base of the heart, meaning the mid mitral and tricuspid valve rings and oriented in such an angulation as to maximize the size of the left and fight ventricle and left and fight atrium. Such a view contrasts markedly to the apical 2 chamber view, which is a view perpendicular to the view described in the present invention. In the apical two-chamber view (described in inter alia U.S. Pat. No. 5,797,396), the transducer is aimed through the maximum short axis diameter of the left ventricle and left atrium only.

Usually for imaging in this view, the patient is in a left lateral decubitus position (lying on their left side), so that the apex of the heart is positioned hanging near the left chest wall. As mentioned above, the long axis view does not necessarily always have to be from the apical position, but that is the preferred view for practice of the present invention.

A variety of filters may be employed to process images in accordance with the invention. In a first step it is preferred to pass one or more filters laterally across a long axis image or parallel to the x-axis to locate the position of the septum. Following this, a right angle filter is passed vertically or parallel to the y-axis to locate the lateral border of the mitral valve annulus. The intersection of the septum and the medial border of the mitral valve annulus may then serve as the registration point of a coordinate system.

It has been found that location of the registration point is best obtained by employing a sequence of different filters. Thus, in locating the septum, it is preferred in a first filtration step to pass a mean filter across a long axis image to determine a maximum mean pixel intensity (brightness). The location of the maximum mean pixel intensity reveals a first approximate location of the septum. Since the septum may not be completely vertical in the images, a series of straight line filters, each comprising a plurality of rows, is then passed across the image to identify the first approximate location of the septum. The straight line filters are preferably Laplacian filters, arranged one above the other in abutting relation. These straight line filters are used to find the centerline of the left ventricle (LV) (shown in steps 2–6). The location of the maximum mean pixel intensity for each straight line filter is determined to thereby provide a second approximate location of the septum in each of the areas of the image scanned by the straight line filters. By creating a least-squares best fit line through the second approximate location of the septum, the slope of the septum in the image may be better defined. Empirical studies have shown that the upper portion of the second approximate location of the septum is preferred for determining the best fit line, and that the upper two-thirds of the second approximate location of the septum is most preferred. A "best fit" line is usually arrived at by a correlation procedure or a least squares operation and is a standard mathematical technique.

If it proves desirable to further define the location of the registration point in an image, this may be done by locating additional structures of the heart in the image. For example, after locating the point of intersection of the best fit line representing the septum and the location of the medial border of the mitral valve annulus, one may rotate (how) the right-angle filter around the axis of their intersection point until a maximum mean pixel intensity is determined. This maximum provides an approximate location of the lateral border of the mitral valve annulus. The intersection point of the lateral and medial borders of the mitral valve annulus and the best fit line representing the septum may then be used as the registration point. In some instances this point may be more precisely defined when comparing multiple image frames than the registration point determined by just using the intersection point of the medial border and the best fit line representing the septum.

As indicated above, when additional specific regions of the myocardium are defined, their location in the image in relation to the registration point may be determined. In preferred embodiments, this may be achieved by determining the coordinates (x, y) of each pixel in the defined regions in relation to the registration point. Then, when comparing a series of image frames, to find the same region of the myocardium in any specific image frame, the registration point is determined in the specific frame and the regions are automatically redrawn based on the coordinates established in the first frame.

It will be recognized that if the various regions of the myocardium were to be defined by a specific set of coordinates, movement of the heart due to breathing or other causation may cause different areas of the myocardium to fall within a given region in a particular frame or that given region may no longer contain any portion of the myocardium. The present invention, however, by defining a particular registration point in terms of heart structure also defines the locations of the regions of the heart in relation to that point and compensation may be made for heart movement. This is particularly true, for example, when frames taken from a specific junction of the heart cycle (e.g., diastole) are compared because the heart tends to have the same shape at the same point in its cycle.

The present invention may have particular utility in determining changes in pixel intensity of a digital image of an apical, long axis view of the heart during application of certain contrast agents. This may be done by obtaining a control frame from a baseline period or interval of the heart cycle prior to injecting a contrasting agent. A registration point is first determined in the control frame as described above. One or more regions of the myocardium are then located in the control frame image in relation to the registration point, and the mean pixel (intensities) of the regions of the myocardium on the control frame determined. The contrast agent may then be injected. Suitable contrasting agents include Albunex® and perfluorocarbon compounds such as Optison®. A preferred agent is Optison®, which is manufactured by Molecular Biosystems, Inc., and available from Mallinckrodt, Inc. (St. Louis, Mo.).

After injection of the contrasting agent, a sequence of end-diastole (ED) frames are obtained. In each of these succeeding frames a registration point in the frame is obtained as described above, thereby locating one or more regions of the myocardium on the ED frame corresponding to the regions on the control frame where the mean pixel (intensity) of the region is calculated. By comparing the mean pixel (intensities) for the ED frame following injection of the contrast agent to those of the control frame, a time-mean brightness curve may be obtained. The time-mean brightness curve for a region of the myocardium may be used to determine whether perfusion is present in the region.

In an overall and general sense, the method provides means for identifying the position of principal major structures in an echocardiographic image of a heart and using the position of these structures to guide a search for finer and finer detailed structures in the image. In other words, the inventors have searched for the position of the interventricular septum first (FIG. 2) as the gross first step and then the slope of the septum as the second step (FIG. 3) using this, the next step is to find the position of the mitral valve plane which is the next gross structure in the image and this is performed using the right angle filter (FIG. 5). This arrives at the reference point noted in FIG. 6, which subsequently allows search for the lateral mitral valve annulus. Knowing the reference point and position of the lateral mitral valve annulus, the midpoint of this line represents the center of the mitral valve plane and is the approximate position from which to measure the long axis length of the ventricle, which extends from this point to the apex epicardium. Alternatively, one might search for the mitral valve plane first and then use that position to search for the septum, which method represents another useful aspect of the invention. A third approach may be to search for the largest blood pool or in other words, use the large black area at the center of the left ventricle as the principle feature in the image. The inventors contemplate, that in its most essential rudimentary form, the invention is using whatever large feature one considers most prominent and then working in a logical fashion from that large feature to the finer detailed positions in the image using adaptive step wise implementation of filters and thresholds to finally locate key positions, such as the positions of the mitral valve annulus (lateral and medial), aortic annulus position, apex of the left ventricle, etc. And finally, achieving the best location for the endocardium and epicardium of the left ventricle for the reasons described above.

3.0 BRIEF DESCRIPTION OF THE DRAWINGS

4.0 DETAILED DESCRIPTION OF PREFERRED EMBODIMENTS

Figure 1A:
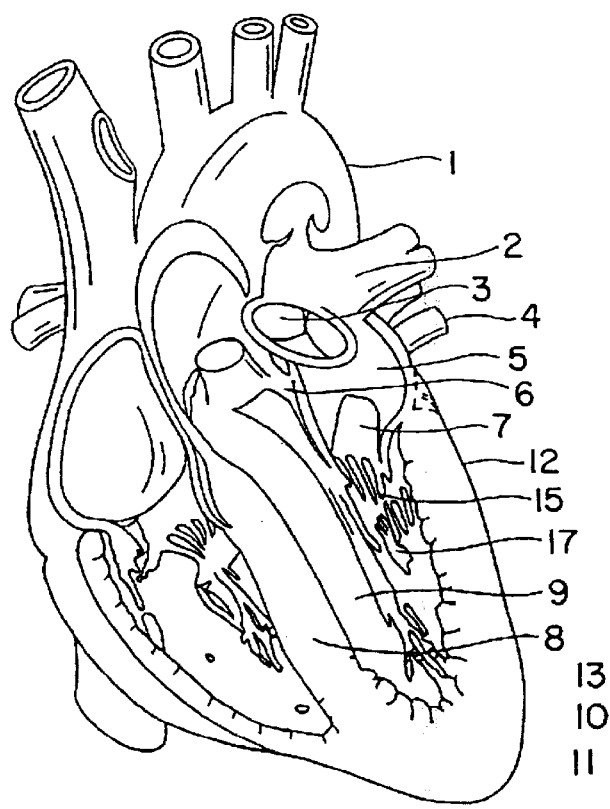
FIG. 1A and FIG. 1B show schematic diagrams of a long axis view of the human heart.
Figure 1B:
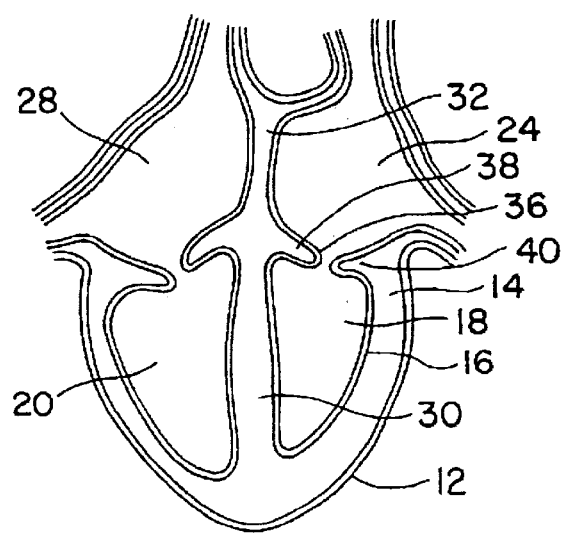

As stated above, the present invention resides in a system for analyzing the structure and operation of the heart. The system is based on information developed by digital images in pixel format of views of the heart taken along its long axis. A schematic section version of such a view is shown in FIG. 1A and FIG. 1B. FIG. 1A shows a human heart wherein the long axis is vertically disposed and designated by the legend 10. The view in FIG. 1B includes the epicardium 12, myocardium 14, and endocardium 16. It also includes the left ventricle 18, the right ventricle 20, the interventricular septum 30, the left atrium 24, and the right atrium 28. It further includes the interatrial septum 32, the papillary muscle 34 and the mitral valve annulus 36. The mitral valve 36 includes a medial border 38 and a lateral border 40. (See FIG. 1B).

In accordance with the invention an image of the heart is preferably taken by making sonograms of the heart. Beams of ultrasonic energy are directed into the heart generally from the apex parallel to the long axis of the heart, and returning echo signals are typically recorded in digital form on magnetic records at the rate of 30–60 image frames/sec. The images thus recorded are then visually displayed in a pixel format and in a series of frames on a cathode ray tube or other suitable video apparatus. The shape of the heart and the shape and relative positions of its features are subject to changes during the cardiac cycle. These considerations and other problems associated with signal quality have tended to complicate analyses of the heart and to make such analyses time consuming and often variable and subjective in interpretation. The present invention resides in a system for automating analyses of the heart so as to make them more objective, more consistent and less costly and time consuming.

Figure 2:
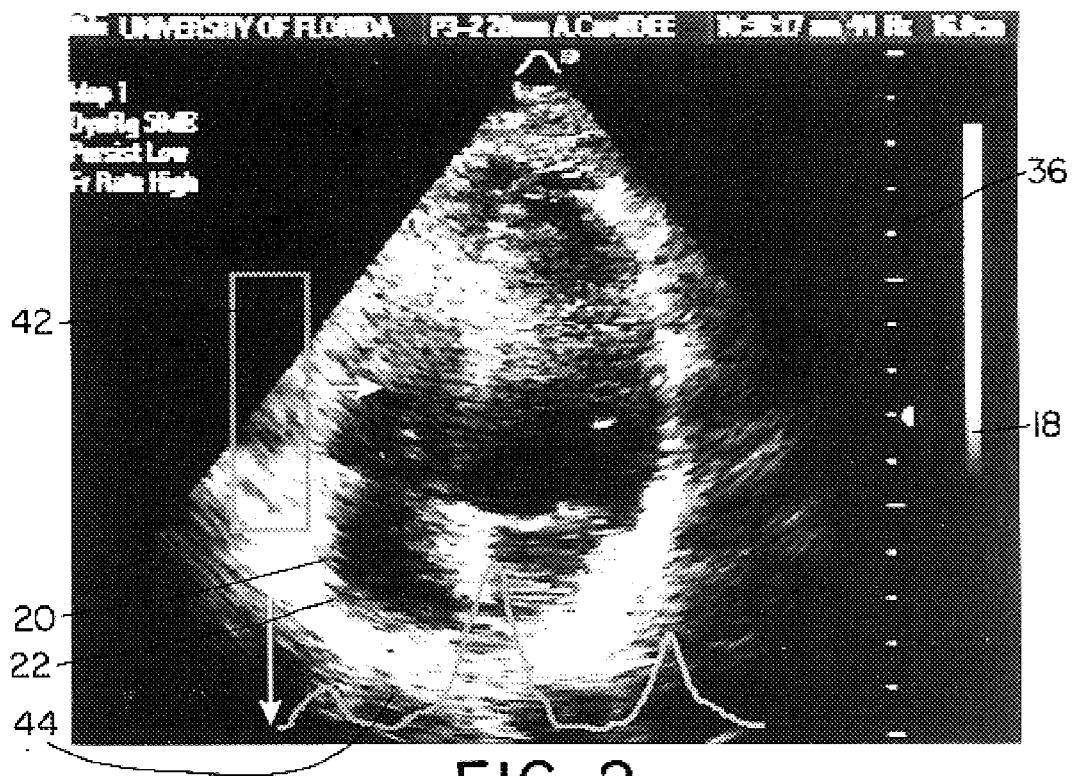
FIG. 2 is a digital image in a pixel format of a human heart illustrating passage of a mean filter from left to right.

FIG. 2 is an actual sonogram or image of a human heart showing the left ventricle 18, the right ventricle 20, the interventricular septum 22, and the region of the mitral valve 36. The rectangle 42 represents a large mean filter which passes through the image from left to right in the FIG. The direction, however, is not critical. The output of the filter is a two dimensional graph of mean brightness across the image providing a first approximation of the position of the septum, which typically runs approximately vertical in apical long axis views. The signal trace 44 at the bottom of the FIG. reaches a peak or maximum value at a point corresponding to passage over the septum 22.

Figure 3:
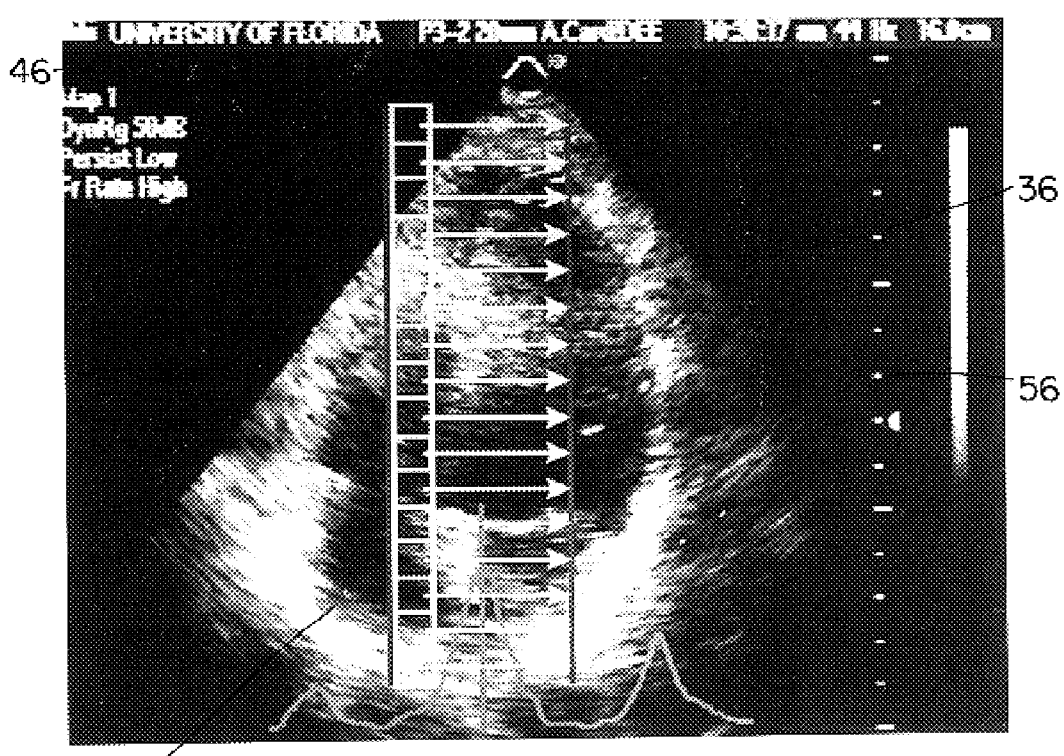
FIG. 3 is another view of the heart shown in FIG. 2 illustrating passage of multiple Laplacian filters across the image shown in FIG. 2 through a region of interest.
Figure 4:
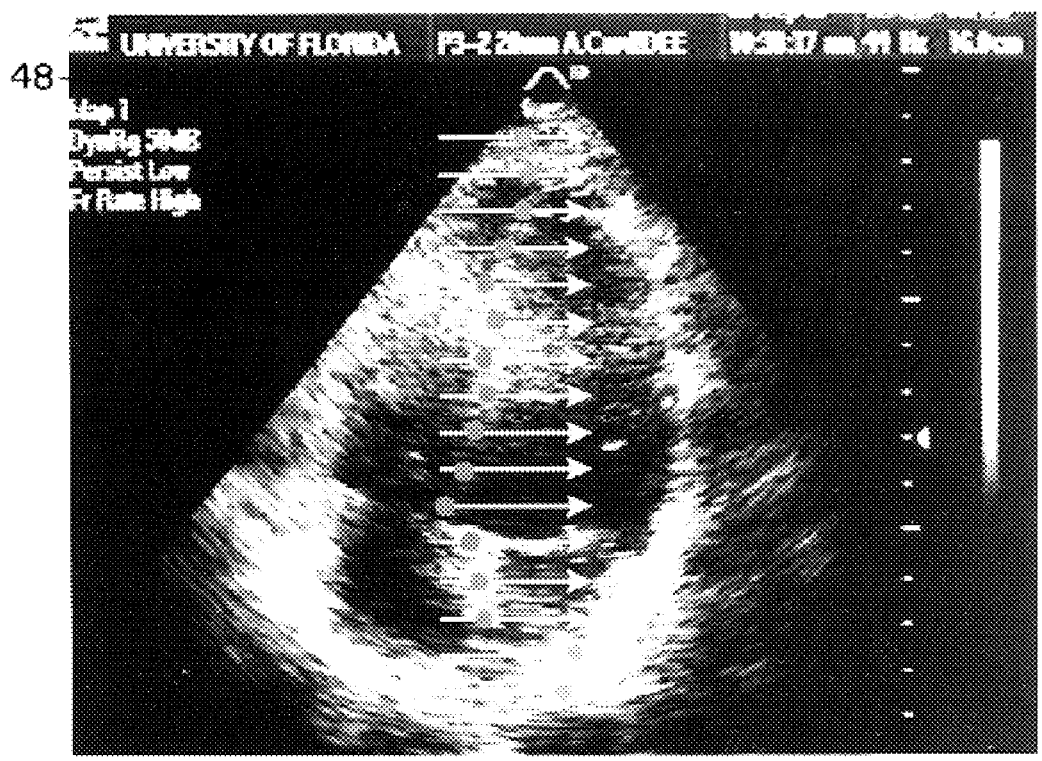
FIG. 4 is another view of the image shown in FIG. 2 and FIG. 3 following completion of the step shown in FIG. 3.

The curve at the bottom of these figures represents the output of the mean of pixels in the box as it is moved across the image from left to right in the method of a large mean filter being moved across the image pixel by pixel summing all of the pixels within that box. The first peak would represent the approximate position of the right ventricular wall, the middle peak would represent the approximate position of the interventricular septum, and the right peak would suggest the approximate position of the left ventricular lateral wall. FIG. 3 shows that using the central peak as the approximate position of the septum, a region of interest in the image can be created (dashed lines) so that individual filters, represented by the small square boxes, can then be moved across the image in that region of interest (between the dashed lines) looking for a more specific location of the septum along each of the arrows from left to right. When the position of the maximum output of these filters is found, shown as the circles in FIG. 4, the slope of the septum can then be approximated by a least square's best fit line through these positions. Thus the curve at the bottom of FIG. 2 and FIG. 3 is best described as a mean brightness curve across the mid portion of the image and the amplitude of each point on the curve is the average brightness of the pixels within the large rectangle as it is moved one pixel at a time across the image from left to right. There is no time involved; this is entirely x-axis position versus average brightness in the rectangle from left to right.

FIG. 3 depicts passage of a plurality of line filters preferably in the form of Laplacian filters (the small squares 46) through the image. Each filter generates a maximum signal, and these maximum signals are represented by the small circles 48 in FIG. 4. It will be noted that the upper roughly two/thirds of the circles 48 form an essentially straight line. The bottom three circles veer off to the right of the FIG. and are ignored in this instance.

Figure 5:
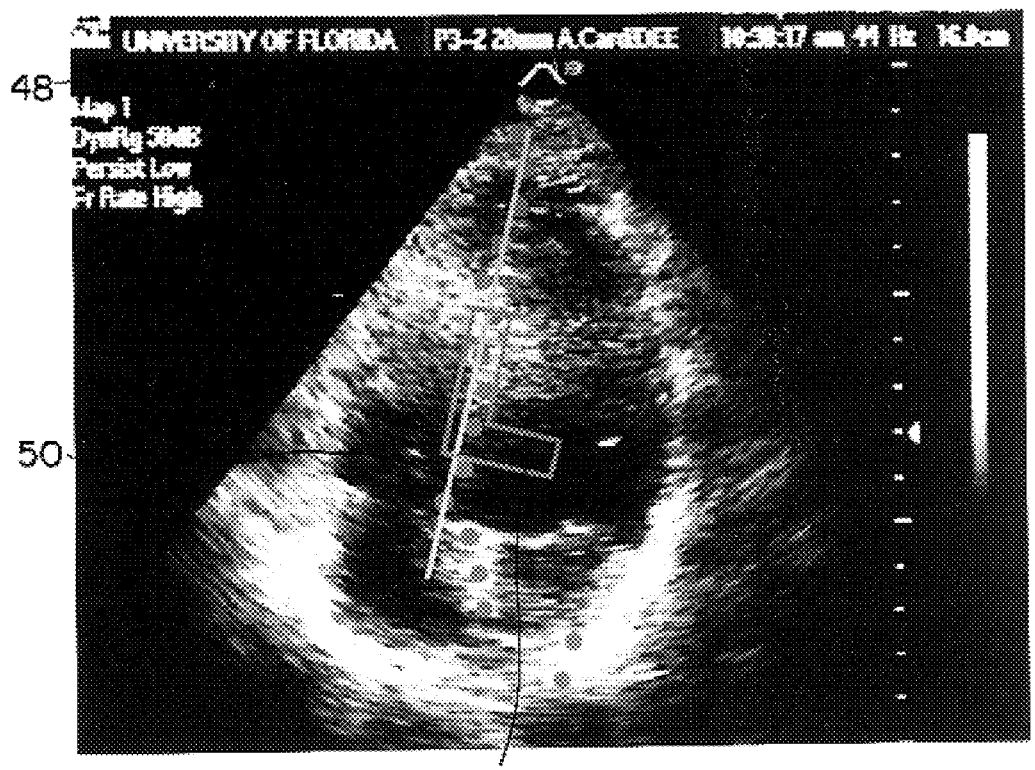
FIG. 5 is another view of the image shown in FIG. 2, FIG. 3, and FIG. 4 illustrating passage of a right angle or L-shaped filter along the slope of the system.

FIG. 5 shows a best fit line 50 extending through the points 48 and connoting a sharper definition of the septum. FIG. 5 also shows a right angle or L-shaped (mean) filter 52 traveling downward through the image to better locate the mitral valve 36.

Referring back to FIG. 3, the Laplacian filters may scan the entire long axis view of the heart. In general, however, the scan is limited to a central portion of the heart to reached both sides of the spectrum—i.e., to reach between the dotted vertical lines 54 and 56. This region is automatically determined based on the curve of the bottom of FIG. 2.

As indicated above, use of the best fit line 50 and the L-shaped filter 52 is based on the observation that the mitral valve ring and the aortic valve ring intersect the best fit line 50 (i.e. the septum) at right angles. The septum and the best fit line 50 extend upward between the right atrium 28 and the left atrium 24, and the right angle filter 52 may scan along the entire best fit line 50. In general, however, it is sufficient to scan between positions above and below the likely position of the aortic and mitral valve rings. The maximum signal generated by right angle filter indicates the position of the valve rings and thus the plane of separation between the atria and the ventricles. The position, preferably taken at end-diastole for the mitral valve, and is the medial ED MV position (see FIG. 6). This position is also designated as the registration point for the purposes of the invention in locating segmented regions of the myocardium. Thus, the registration point serves as a guide to locate the different regions when viewing long axis images of the heart at different points in its cycle. Without the use of a registration point, movement of the heart, as by breathing would otherwise, may tend to give inaccurate results—e.g., such movement may cause a region of interest to move out of an alignment with the border of the myocardium.

The use of the registration point is particularly of value when comparing several long axis frames in a sequence of triggered images, also known as transient response images.

It is also to be noted that the registration point may be used as a guide in locating segmented regions either manually or automatically.

Figure 6:
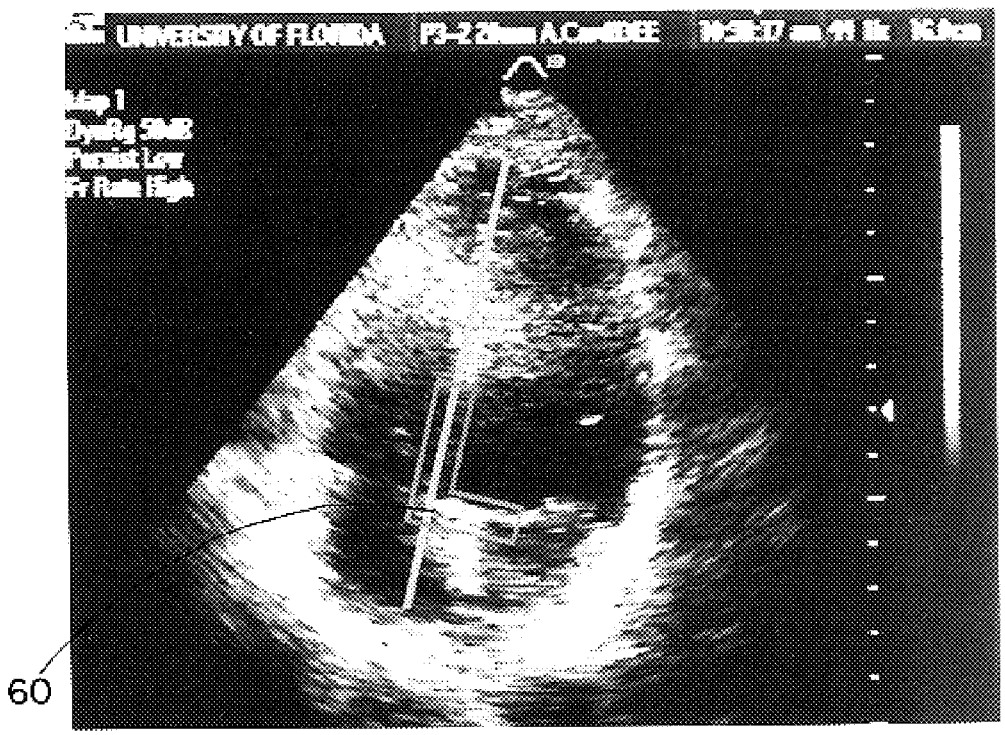
FIG. 6 is another view of the image shown in FIG. 2, FIG. 3, FIG. 4, and FIG. 5 showing the ED medical MV annulus position.
Figure 7:
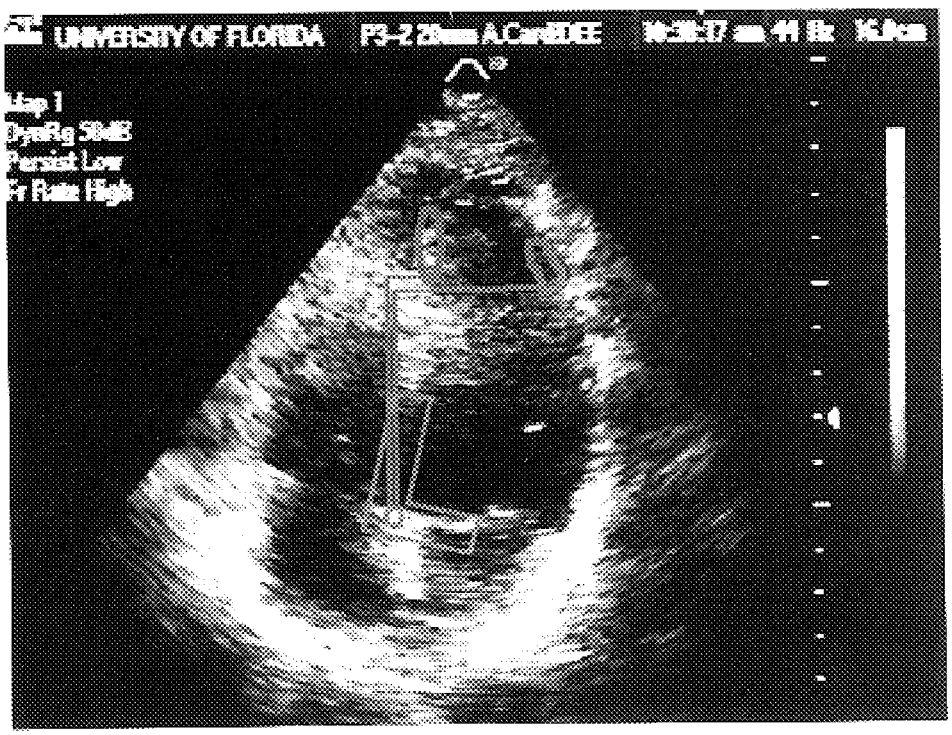
FIG. 7 is another view of the images shown in FIG. 2, FIG. 3, FIG. 4, FIG. 5, and FIG. 6 where two regions of the myocardium are shown with respect to the reference for the purpose of translation on subsequent frames.

FIG. 6 illustrates a reference point 60 as established by the invention at the ED MV position. FIG. 7 shows how two circled regions may be located by reference to the registration point. The dotted lines indicate X and Y coordinates to identify the positions of the two regions.

4.1 Echocardiography

Echocardiography is an important tool for the evaluation of the health of the heart. The principle advantages of two-dimensional echocardiography (2D Echo) are its ability to supply real time feedback of the structure and function of the heart, its portability, safety, and relatively low cost as compared to contrast CT and contrast MRI. These advantages exist in part because ultrasound is a low-energy long wavelength imaging modality. However, these features are also responsible for the frequent occurrence of less than optimal images. One of the most difficult parts of interpreting echocardiographic studies is the problem of making important patient care decisions on the basis of images that are marginal in quality.

There has been interest in developing ultrasound contrast agents which would improve the diagnostic performance of studies in a manner similar to contrast CT or contrast MRI. The first FDA approved agent is a sonicated preparation of human serum albumin (Albunex®). This agent consists of small microbubbles of air encapsulated in 5% human serum albumin, which are predominately in the range of 4.5 $\mu$m, allowing them to pass through pulmonary capillary beds (Geny, 1993). Thus, the agent is able to enhance left sided cardiac structure identification from a peripheral IV injection. Previous in vitro studies have shown that left ventricle (LV) opacification and microsphere concentration decrease with increased acoustic power output or increased exposure to the ultrasound beam.(Wray 1991, Padial, 1995). Since the approved use of these contrast agents are to delineate the LV cavity for better estimation of LV function and wall motion, factors that effect the time-brightness curves created by these bubbles are of significant clinical importance. Although with a peripheral IV injection of Albunex®, the LV is delineated well using fundamental 2-D imaging, myocardial perfusion is not reliable. (Sanders, 1991) However, previous studies have shown myocardial perfusion with left atrial or aortic root injections of Albunex® (Kaul, 1995 Kaul, 1996). Although these methods are effective, a peripheral IV injection would be preferable. With the development of second harmonic image formation (Mulvagh, 1996), myocardial contrast from an IV injection of Albunex® becomes a possibility.

The short life-span of Albunex® is an advantage when second harmonic image formation is used. Due to the quick clearing of contrast from the left ventricle, myocardial contrast can be differentiated from the "blooming effect" of the contrast within the ventricles, and differentiated from entrapment of the bubbles in the ventricular trabeculae (Sanders, 1991). The rapid clearance may also facilitate intra-patient comparisons, e.g., before and after administration of nitroglycerin, and using interventions with the patient as his/her own control.

4.2 Segmentation Methods

A variety of spatial and temporal techniques have been developed for computer assisted quantitation of the left ventricle using the short-axis view. Some research groups have employed only spatial processing in their quantitation efforts (Bosch et al., 1988; Chu et al., 1988; Wilson and Geiser, 1992), while others have attempted to measure cardiac function by using only temporal calculations (Duncan et al., 1991; Mailoux et al., 1987; Mailoux et al., 1989; Prasad and Srinivasan, 1987). Some methods employ both spatial and temporal information (Adam et al., 1987; Friedland and Adam, 1989; Geiser et al., 1990; Zhang and Geiser, 1984; Wilson et al., 1993).

4.3 Spatial Processing Techniques

Bosch et al. presented a method for endocardial border detection (Bosch et al., 1988). The method is based on finding an optimal path through a cost matrix. Each entry in the matrix represents the cost of a point as defined by the spatial first-derivative value and several positional parameters. The minimum-cost method requires the definition of a contour model. Due to restrictions imposed by the algorithm, the actual boundary cannot differ much in shape from the model. The procedure requires the manual definition of the left-ventricular center point. The authors remark that papillary muscles are problematic for the automatic determination of the boundary. In particular, if papillary muscles are present, they are included as part of the endocardial border.

Chu et al. developed an algorithm to detect both endocardial and epicardial boundaries in a single echocardiographic image (Chu et al., 1988). Spatially significant features are identified based on the measurement of image intensity variations. The main steps include edge detection using a Gaussian edge detector, radial search for initial border estimates, and nonlinear processing of the boundary estimates to compensate for dropout and poor contrast. An interpolation procedure is used to fill in missing points. A secondary search takes place after a median filter is applied to the image. An observer is required to enter the center of the cavity and specify the regions of search. The algorithm makes no attempt to exclude papillary muscles from the endocardial boundary.

Wilson and Geiser employed circular-arc matched filter techniques to provide an accurate approximation of the left-ventricular center in a single frame (Wilson and Geiser, 1992). The search for the center is initiated by first approximating the epicardial posterior border. Next, a coupled circular-arc matched filter is employed to estimate the position of the epicardial and endocardial borders for the anterior wall. The estimate of the center of the left ventricle is the midpoint between the approximated anterior and posterior epicardial borders. In this report, the authors did not pursue full border detection.

4.4 Temporal Processing Techniques

The nonrigid motion of a deformable object is tracked and quantified from its bounding contours in a paper by Duncan et al. (1991). The technique is applied to the problem of tracking left-ventricular endocardial borders. Motion is computed by matching local boundary segments in consecutive frames and using a measure of bending energy to minimize contour deformation between segments. Results from the matching process are incorporated into an optimization function along with a general smoothness term. The computation is performed for all pairs of frames in the temporal sequence resulting in a composite flow-field over the entire image sequence. The method requires that the bounding contours are traced for all frames in the sequence by an observer.

In research performed by Mailoux et al., the motion of the heart is quantified from digitized image sequences (Mailoux et al., 1987). The method computes the two-dimensional (2-D) velocity vector at every point of an image to approximate the motion from one image to the next. The first step in the method is to extract a region of interest from each frame. Next, the region is smoothed by a large mean filter and reduced by a factor of three. The velocity vector between every two frames in the sequence is computed by the Horn and Schunk (1981) method over every pixel in the image. The method requires four hours of processing time on a PDP 11/44.

Mailoux et al. employed the (2-D) velocity vectors to determine what part of the motion is due to translation, rotation, contraction, and deformation of the myocardium (Mailoux et al., 1989). The method assumes that the interframe velocity field U(z, y), V(z, y) can be locally described by linear equations in the form: U(x, y)=a+Ax+By: V(x, y)=b+Cx+Dy. The myocardium is divided into 12 sectors and the velocity fields are computed independently for each sector. The flow parameters (a, b, A, B, C, D) are then used to represent each sector's velocity field as the summation of four vector fields: a translational field, a rotational field, a divergent field, and a shear field. A mean filter is applied over all frames in the sequence before the computation of the optical flow.

In a paper presented by Prasad and Srinivasan, cardiac displacement activity is assessed by computing the direction and amplitude of a displacement vector from one frame to the next (Prasad and Srinivasan, 1987). The observer is required to enter the window of interest and a number of control points on the endocardial boundary. Matching errors for all displacements of the window are computed between consecutive frames by summing absolute values of gray intensity differences. A valid displacement vector is defined as the one that provides the minimum matching error over all possible displacements. The performance of the algorithm was evaluated using synthetic images.

4.5 Combined Spatial and Temporal Processing Techniques

Adam et al. introduced a procedure for myocardial border tracking of the endocardial and epicardial edges (Adam et al., 1987). The main steps in the algorithm include nonlinear filtering of the images, debiasing of gray levels, and location-dependent contrast stretching. The algorithm is based upon tracking movement of a number of predefined points located on the endocardial and epicardial contours. An iterative search is applied to detect the border points from one frame to the next. Border contours are reconstructed by spline interpolation of the border points. The technique requires an observer to predefine a set of points on the endocardial and epicardial boundaries.

Simulated annealing is used by Friedland and Adam for the detection of cavity boundaries in long-axis echocardiographic images (Friediand and Adam, 1989). The main steps of the method are image decimation using a low-pass filter, radial gradient estimation to determine the center of the cavity, and definition of a 64-member (one for each of 64 radial directions), one dimensional (1-D), cyclic, Markov random field (MRF). An optimization is performed upon the MRF minimizing an energy function which defines a Gibbs distribution over the system. Temporal information from adjacent frames is integrated into the two parametric models.

In research accomplished by Zhang and Geiser, an algorithm is presented for extracting the endocardial borders from a series of 2-D echocardiograms (Zhang and Geiser, 1984). The main steps in the algorithm are coordinate transformation, regional co-occurrence matrix thresholding, region of search confinement, border detection, and spatial and temporal smoothing. The observer is required to draw outlines of the borders at the end-diastolic and the end-systolic frames. Image processing is limited within a range defined from the observer-drawn outlines. The papillary muscles can be excluded from the observer-drawn outline estimates and thus not processed as part of the border.

Geiser et al., presented an edge detection algorithm for endocardial and epicardial boundaries (Geiser et al., 1990). Images are processed radially along 256 rays and down sampled to 64 radial lines. Each ray is differentiated using a central difference approximation. Borders in the algorithm are found through an iterative process by means of predictive windowing by repositioning and narrowing the search windows. Candidate points are selected over the 64 rays for each frame in the sequence and consequently smoothed through space and time. The method requires an expert observer to enter estimates of the endocardial and epicardial borders for the opening end-diastolic frame, end-systolic, and closing end-diastolic frame of the cycle to be studied. Papillary muscles are excluded by utilizing knowledge of the wall thickness.

A technique introduced by Wilson, Geiser, and Li provides automatic estimates of the left-ventricular center, the epicardial posterior and anterior borders (Wilson et al., 1993). The method based on the use of large matched filters, identifies a single fixed center point by automatically approximating the epicardial and endocardial borders for the end-diastolic and the end-systolic frames. The rational behind this matched-filter approach is based on a combination of considerations including the physical anatomy of the left ventricle, the instrumentation of the ultrasound device, and the geometry of the reflectance surface. Since the pixel locations in the image comprising the left ventricle typically form an oval shaped region, circular arcs provide a reasonable approximation over fairly broad portions of the epicardial boundary. Since the posterior lung and myocardium/pericardium interface forms a large (relative to the wavelength of the signal) smooth surface that is virtually orthogonal to the signal, it tends to be the most prominent feature in the image. Thus, this border is searched for first with a semicircular matched filter that is designed to identify a step up from low to high values. A similar filter is used to identify the anterior epicardial border. An index associated with the posterior filter provides an indication of the quality of the image as well as a reliability measurement of the estimate. When tested on 207 image sequences, 18 images were identified by this index as unsuitable for processing. Of the remaining 189 image sequences, 180 computer estimates of the center were judged acceptable when compared with approximations made by an independent expert observer. The algorithm requires no observer intervention and is central to the method presented here.

4.6 Illustrative Embodiments of the Invention

The following discussion assumes a 512×480 pixel image. However, as one skilled in the art will appreciate the following discussion may be readily applied to an image of any resolution.

FIG. 1A and FIG. 1B disclose diagrams of the left ventricle and part of the right ventricle of a heart viewed along the short axis of the heart. Indicated for the left ventricle are the anterior endocardial border 10, the anterior epicardial border 11, the posterior endocardial border 12, and the posterior epicardial border 13. The regions of tissue protruding into the left ventricle near the posterior endocardial border 12 are the papillary muscles 17. The cross-section of the left ventricle is approximately elliptical in cross-section for both the endocardial border and the epicardial border.

Shown superimposed on the diagram of the left and right ventricles is a set of lines that are commonly used to arbitrarily divide the left ventricular region into eight 45° sectors. The sectors are commonly numbered in order from 1 through 8, beginning with the sector encompassing the anterior left ventricle free wall 1 and proceeding counter-clockwise to the anterolateral left ventricular free wall 8. Sectors 2, 3, and 4 encompass the interventricular septum 16, which separates the left ventricle from the right ventricle.

In the preferred embodiment, the inventive method is implemented by means of a computer program on a computer. Echocardiographic images are obtained from an ultrasound system that acquires frames at a rate of approximately 30 frames per second. Such ultrasound systems are well known in the art. The frames are digitized and stored on any convenient storage medium (such as a magnetic or optical disk drive). In the preferred embodiment, digitization of the frames is carried out using a 512×480 pixel matrix. Sampling and digitizing such image data is well known in the art, and is commonly carried out by "frame grabber" circuitry. Preferably, video frames for the entire cardiac cycle to be studied are digitized.

The images necessary for processing in the computer are preferably in a digital pixel format. These images do not have to be displayed, (the algorithm computes the data from the pixel format image and not from the visual image itself) although the fidelity of the method is assured by a visual comparison and analysis of the image by a skilled clinician. Thus, the images are typically displayed as visual images.

The first step in the automated process of the present invention is to determine the center-point of the left ventricle and a search region for border discrimination. The center-point is estimated in one embodiment by using circular arc filters to determine the approximate positions of the epicardial and endocardial borders. In another preferred embodiment, the center-point is estimated by first determining the position of the posterior epicardium using a circular arc filter, and then making an approximation of the positions of the right and left epicardium using elliptical arc filters. Once the center-point and search regions are estimated, the probable positions of the epicardial and endocardial borders are more closely approximated. In a first embodiment of the inventive method, the probable positions of the epicardial and endocardial borders are approximated by generating amplitude distibutions along each oi a number of circular segments based on the computed center-point. In a second preferred embodiment of the present inventive method, the probable positions of the epicardial and endocardial borders are approximated by using matched elliptical filters which are dynamically determined by the radius to the anterior and posterior walls, the semi-major axis, and the distance from the center-point to the right and left borders. Then both the epicardial and endocardial borders are then approximated by closed contours each forms as the union of four elliptical arcs. The echocardiographic image may then be displayed with the modeled border superimposed upon the image.

Figures of merit are calculated during the process of defining the epicardial and endocardial position estimates. The figures of merit may be used for image enhancement purposes. Image enhancement can be performed manually by a technician, or automatically wherein the figures of merit can be provided as feedback data to the ultrasound system.

4.7 Abbreviations and Definitions

The following terms and variables are defined as such throughout this application:

m=# of rows in the sector scan
n=# of columns in the sector scan
   Key variables associated with posterior filter:
reach_p=reach associated with posterior filter
inner_radius_p=inner radius associated with posterior filter
outer_radius_p=outer radius associated with posterior filter
band2_=width of band associated with 2nd rectangle of computation in posterior filter
band3_=width of band associated with 3rd rectangle of computation in posterior filter
   Key variables associated with anterior filter:
reach_a=reach associated with anterior filter
outer_radius_a=outer radius associated with anterior filter
reach_b_a=reach associated with band in anterior filter
min_wall=minimum wall thickness
   Definitions:
reach_p=m/50
outer_radius_p=m/4
inner_radius_p=outer_radius_p-7*reach_p
band2_p=m/6+1
band2_p=m/24+1
reach_a=m/60
outer_radius_a=m/5
inner_radius_a=outer_radius_a-7*reach_a
reach_b_a=m/25
min_wall=2*reach_p

4.8 Method of Automated Video Densitometry

The present invention also includes a method for automating video densitometry, or automatically determining the optical or photographic density of the scanned images. The first step of the inventive method is to obtain the image in a digital format. A sequence of triggered end diastolic images (videotaped or live from the video output of the ultrasound machine) are digitized (usually at 256×240 pixels, 256 gray levels). Preferably, 64 sequential ED frames obtained beginning at the time of peripheral injection of a contrast agent are digitized. In each sequence, control frames are first obtained from the baseline period before any contrast agent injection.

Next, because the images digitized from a video source contain patient data, the ECG, and other irrelevant information, the sides and last row of the sector scan are identified so that only sector scan data (ultrasound data) is processed.

Next, the algorithm detects the approximate position of the endocardial and epicardial borders on a sequence of ED control frames. Because the passage of a contrast agent (e.g., Albunex®) through the right and left ventricular chambers frequently causes severe attenuation of the signal and subsequent loss of myocardial structure in the image, endocardial borders defined during the control period are used as the region of interest for the left ventricular chamber in the sequence of ED frames obtained after the peripheral injection of the contrast agent.

The algorithm establishes a region of interest for the right ventricular outflow tract. This region is trapezoidal in shape. The lower bound of the right ventricular region is defined as the anterior septal surface. The remaining three boundaries are defined by the edge of the scan on the left, an anterior bound at 20% of the left ventricular epicardial diameter anterior from the anterior septum, and a right bound at 10% of the left ventricular diameter to the right of the midline of the left ventricle.

To ensure that the left ventricular endocardial border and the right ventricular outflow tract region of interest are properly registered on all frames throughout the respiratory cycle, the position of the posterior epicardium on each frame following injection of the contrast agent is approximated by computing the posterior circular arc filter, and translating the regions of interest by the difference in position of the filter as compared to the position on the first control frame.

The mean pixel intensity for the left ventricular chamber is calculated for the pixels enclosed by the approximate endocardial contour. Similarly, the mean pixel intensity of the right ventricular outflow tract is calculated. For each of the control ED frames, the mean pixel brightness is considered the background brightness.

The mean pixel brightness for the ED frames following injection of the contrast agent is then compared to this background. This results in a time-mean pixel brightness curve for each injection.

Subsequently, the maximum right ventricular mean pixel brightness is recorded and the area under the right ventricular time-brightness curve above background is calculated for each injection. For the left ventricle, the minimum mean brightness, maximum mean brightness, area under the left ventricular time-brightness curve above above background are calculated.

Because both the epicardial and endocardial contours of the parasternal short axis view are approximated, the mean pixel brightness of the pixel between the two borders can also be calculated. This represents the mean pixel brightness of the myocardium of the left ventricle. By segmenting the regions of myocardium into regions approximating the distributions of the coronary arteries, the method can be used to estimate whether perfusion is present in a region, by comparing a pre-contrast mean pixel brightness to that calculated after peripheral injection of one of the transpulmonary ultrasound contrast agents.

The automated method for video densitometry described above may find widespread application when improvements of myocardial contrast agents are developed. Specific regions might be set up with prior models in order to identify perfused myocardial regions or to detect the occurrence of myocardial reperfusion following thrombolytic therapy in acute myocardial infarction. With stable contrast agents, the brightness curve over the left ventricle may permit the calculation of cardiac output by a means similar to the dye dilution method. Application of the above described method in long axis views with regions placed over the left atrium and left ventricle, for example, may facilitate evaluation of the severity of valvular insufficiency, such as mitral regurgitation, and possibly calculation of regurgitant volume.

5.0 EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

5.1 Example 1

A Method for Evaluation of Enhancement Operations in Two-Dimensional Echocardiographic Images The purpose of this Example is to report the methods and results of a locally calculated peak-to-background ratio that can be used to objectively estimate the degree of enhancement achieved in a two-dimensional echocardiographic image.

5.1.1 Methods 5.1.1.1 Data Acquisition

Two-dimensional short-axis ultrasound images were obtained retrospectively from six patient studies performed for routine diagnostic reasons in the clinical echocardiography laboratory at the University of Florida (Gainesville, Fla.). A representative end-diastolic and end-systolic frame from each of these six patient studies was converted from videotape to digital format. Analog-to-digital conversion was carried out to produce a 256×240 pixel image at 4-bit depth (16 gray levels). From each of these images a 120×140 pixel region of interest was selected by manual windowing. The resulting 12 regions of interest were transferred to an IBM RT/PC model 135 (White Plains, N.Y.) for subsequent processing.

5.1.1.2 Calculation of the Peak-to-Backgrond Ratio

Ultrasound images are unusual in medical imaging because the process of image formation necessitates that in the sector scan format most frequently used for cardiac studies the axial resolution is different from the azimuthal resolution. In the digitized videotape images used in this research the digital frame is acquired in Cartesian coordinates. Thus this difference in resolution is only approximated by a difference in the horizontal (azimuthal) and vertical (axial) resolutions.

The images of this study were obtained by use of 2.5 and 3.25 MHz transducers. The expected system resolutions are 1.2 to 1.5 mm in the axial direction and 2.4 to 3.1 mm in the azimuthal direction. The size of a pixel in the digital images is dependent on the depth setting at the time the image was recorded. At the 256×240 pixel resolution of the digital conversion, however, there is approximately 0.7 mm per pixel. Thus the resolution cell is approximately 1 to 2×3 to 5 pixels.

Because of this difference in resolution, however, the peak-to-background ratios were calculated separately in the horizontal and vertical directions. Inasmuch as the method of calculation in both directions is similar, only the horizontal calculation will be discussed in detail. (In the vertical direction the peak-to-background ratio is calculated by forming a band of columns and summing pixels across rows in the digital image [vide infra].) The results in both directions, however, are presented.

The horizontal and vertical peak-to-background ratios are calculated in bands that extend for+10 rows or columns from the row (column) containing the center of the left ventricle in the short-axis view. The region from which the horizontal peak-to-background ratio is calculated is outlined. In this horizontal band, the gray level values in each column are summed to form a total gray level versus column number distribution. The ±10 rows is arbitrary, but an assumption is made that the structures of interest, (i.e. primarily the endocardium and epicardium of the left ventricle) are roughly parallel to the columns being summed. When this condition is met, the rows within the band can be thought of as "registered." Thus the 21 pixel values in each column can be added together to produce a single "signal-averaged" intensity curve that represents the image in this horizontal region. The peaks in this cumulative gray scale distribution are then assumed to represent the specular targets or accumulations of specular targets and are the signal that is to be detected or enhanced. Regions that are classified as non-peak will be assumed to be background intensity.

The peaks in this cumulative gray level curve are defined as the zero crossings of the first derivative. Because the horizontal resolution is approximated at 3 to 5 pixels and because the possibility exists of identifying minor peaks as structure, a pixel location is considered to be a zero crossing only if it is preceded by at least two negative values and followed by at least two positive values of the derivative. The first derivative is calculated by use of a seven-element central difference approximation as shown below:

$$\frac{dG}{dc} = [-1 - 1 - 1(0) + 1 + 1 +]$$

in which G is the gray level and c is the column. A furrther restriction on the identification of a pixel location as a peak is that at least five columns must separate one peak from the preceding peak. Once a peak location, x, is determined by use of these criteria, the width of the peak is defined to be the number of pixels within five of x with the property that their values are above the half power point (i.e. above 0.707 times the local maximum cumulative gray level values at x). At these half-power widths, adjacent peaks may abut but not overlap. Furthermore, to eliminate very minor peaks that should be considered part of the background, the area under a peak at its half-power width must be at least 2.0% (one fiftieth) of the total area under the cumulative intensity curve.

After the peaks are defined, the total width (in columns) of the peaks at their 0.707 shoulders is established and the average amplitude is calculated. The sum of the remaining gray levels under the curve is divided by the total remaining width of the band to obtain the average background intensity. Finally, the peak-to-background ratio is defined to be the ratio of the average peak intensity to the average background intensity.

5.1.1.3 Evaluation of the Peak-to-Background Ratio

To evaluate the usefulness of the peak-to-background ratio in estimating image improvement, the standard Laplacian operator (Panda and Dubitzki, 1979) was chosen as the enhancement mask. This operator is a central difference approximation consisting of the sum of the second derivative in the horizontal direction with the second derivative in the vertical direction. A common 3×3 element implementation is shown below:

$$L = \begin{bmatrix} 0 & -1 & 0 \\ -1 & (+4) & -1 \\ 0 & -1 & 0 \end{bmatrix}$$

in which L is the value of the Laplacian. Note that the operator has five non-zero elements. Note further that for each odd integer, n, it is easy to expand this operator to an n×n operator with the exact same five non-zero weights. For example, in the case of a 21×21 mask, each of the negative weights will be at a distance of 10 units from the central value of +4. The 3×3 mean filter is the convolution operator whose kernel has the property that each of its nine non-zero weights is 1/9 and is contained in a 3×3 square centered around the center pixel.

For each odd integer, n, between 3 and 21, the 3×3 mean filter and the n×n Laplacian was applied to each of the 12 test images. After the result was displayed on the screen, two observers studied these enhanced images and came to a consensus concerning which size of Laplacian operator produced what they considered an optimal image of an enhancement for subsequent processing. This decision was based on clarity, of endocardial and epicardial structure, suppression of confusing background content, and lack of a loss of detail that might be caused by the reaching of the larger mask sizes across adjacent structures.

Both the horizontal and vertical peak-to-background ratio were then calculated for each size of enhancement of each of the 12 images. The resulting peak-to-background ratios in each direction were then compared by use of a paired t-test to statistically evaluate the differences in convolution size. The values were compared with a standard two-tail method. A significance level of $p<0.05$ was considered to be an important difference between the peak-to-background ratio resulting from different convolution sizes.

To subjectively evaluate enhancement and the definition of peaks by the method, each of the enhanced images was displayed on the screen with the position of the horizontal and vertical peaks displayed on the enhanced images. Two observers independently evaluated whether the peaks fell on true cardiac structure or were associated with accumulated gray levels caused by acoustic speckle or noise. These decisions were made for both horizontal and vertical computer-detected peaks defined according to the criteria described. Whether associated with the left or right ventricle, structures were defined as endocardium, epicardium, pericardium, chordal apparatus, or valvular apparatus.

Finally, to evaluate whether the peak-to-background ratio is related to improved precision of measurements, two observers independently defined the radial distance to the epicardium and endocardium along eight equiangular radii extending from the previously defined center point. The mean difference between the two observers for the original image and the images enhanced with 5×5, 7×7, 9×9, and 11×11 convolutions were calculated. The individual paired differences between observers for the original images and for each of these levels of enhancement were compared by use of a paired t-test. A level of significance of $p<0.05$ showed a significant decrease in the differences in measurement (i.e. increased precision) between the two observers. In addition, the epicardial and endocardial radii defined by the two observers at each mask size were compared with a paired t-test. For this latter comparison the lack of a significant difference between the radii of the two observers at a given mask size was considered a marker of improved measurement precision.

Results

Consensus of the two observers in subjectively evaluating image improvement revealed that the preferred Laplace convolution size was 9×9 pixels.

The calculated horizontal and vertical peak-to-background ratios for increasing Laplace convolution sizes are shown in Table 1. In the first part of Table 1, diastole and systole for the six patient studies are separated. In the second part of Table 1, the horizontal and vertical peak-to-background ratios are expressed as the mean over all 12 frames. There is a statistically significant increase in the peak-to-background ratio between the mask size of 3×3 and 5×5 in the vertical direction and between the 7×7 and 9×9 masks in both the horizontal and vertical directions.

pixel units. The interobserver mean difference in epicardial measurements decreases as the mask size is increased to

TABLE 1

HORIZONTAL AND VERTICAL PEAK-TO-BACKGROUND RATIOS FOR INCREASING LAPLACE MASK SIZE

| | Mask Size | | | | | | | | |
|---|---|---|---|---|---|---|---|---|---|
| | 3 × 3 | 5 × 5 | 7 × 7 | 9 × 9 | 11 × 11 | 13 × 13 | 15 × 15 | 17 × 17 | 19 × 19 | 21 × 21 |

Dependence on phase of the cardiac cycle and direction
Diastole*

| | | | | | | | | | | |
|---|---|---|---|---|---|---|---|---|---|---|
| Horizontal | 2.09 | 2.88 | 3.46 | 4.92 | 5.58 | 5.44 | 5.36 | 5.87 | 6.31 | 6.00 |
| Vertical | 3.01 | 3.94 | 4.30 | 5.37 | 5.89 | 6.08 | 7.95 | 8.45 | 8.23 | 7.83 |

Systole*

| | | | | | | | | | | |
|---|---|---|---|---|---|---|---|---|---|---|
| Horizontal | 2.04 | 2.29 | 2.92 | 3.89 | 4.00 | 4.36 | 4.82 | 4.99 | 5.29 | 5.97 |
| Vertical | 2.61 | 3.32 | 4.04 | 5.30 | 5.54 | 6.18 | 6.41 | 6.51 | 6.45 | 6.37 |

Dependence on direction alone†

| | | | | | | | | | | |
|---|---|---|---|---|---|---|---|---|---|---|
| Horizontal | 2.07 | 2.57 | 3.19 | 4.41‡ | 4.79 | 4.90 | 5.09 | 5.43 | 5.80 | 5.99 |
| Vertical | 2.81 | 3.63‡ | 4.17 | 5.34‡ | 5.71 | 6.13 | 7.18 | 7.48 | 7.34 | 7.10 |

*Mean of six frames.
†Mean of all 12 frames.
‡$p < 0.05$ with respect to the preceding mask size.

Table 2 shows the results of the subjective impression of two observers in deciding whether computer-identified peaks in the bands resided on signal or on noise. Because of the observer preference and because the last statistically significant increase in the peak-to-background ratio occurred between the 7×7 and 9×9 convolution mask sizes, only the results of the 9×9 convolution are shown in Table 2.

TABLE 2

NUMBER OF PEAKS RESIDING ON SIGNAL AND NOISE WITH RESPECT TO ENHANCEMENT AND DIRECTION

| | Signal | Noise |
|---|---|---|
| Original | | |
| Horizontal | 57 | 5 |
| Vertical | 62 | 11 |
| Laplace | | |
| Horizontal | 78 | 1 |
| Vertical | 73 | 14 |

Results for the 9 × 9 Laplace convolution are shown.

In the original images, 92% (57 of 62) of horizontal peaks defined were judged to represent structures of interest. In the images enhanced by use of the 9×9 convolution, 99% (78 of 79) of peaks were found to be associated with structures.

In the vertical direction, the resolution is better so that the variability of the cumulative gray level curves is much greater. Peaks judged to be structures of interest represented 85% (62 of 73) of peaks defined by the observers in the original images, whereas in the enhanced images, 84% (73 of 85) of peaks defined were found to identify structure.

Table 3 shows the comparison of measurements of radial length made along each of eight equiangular lines by the two observers in the 12 images. The first section of Table 3 shows the mean difference between the 96 pairs of measurements for the epicardium and endocardium, respectively, on the original images and the images after mean filtration and enhancement by use of 5×5, 7×7, 9×9, and 11×11 Laplace mask sizes. All measurements are in 9×9. The second section of Table 3 shows that this decrease in interobserver variability is significant (p<0.0005) at the 7×7, 9×9, and 11×11 mask sizes. However, the paired epicardial radial lengths for the two observers remain statistically different as shown in the third section of Table 3.

TABLE 3

COMPARISON OF INTEROBSERVER RADIAL MEASUREMENTS

| | | Mask Size | | | |
|---|---|---|---|---|---|
| | Original Image | 5 × 5 | 7 × 7 | 9 × 9 | 11 × 11 |

Mean interobserver differences in radial length*

| | | | | | |
|---|---|---|---|---|---|
| Epicardium | 3.4 | 3.2 | 2.5 | 2.0 | 2.0 |
| Endocardium | 2.1 | 2.1 | 1.9 | 2.0 | 2.2 | p Values for mean interobserver differences at each mask size compared with original image

| | | | | | |
|---|---|---|---|---|---|
| Epicardium | | NS | 0.0005 | 0.0005 | 0.0005 |
| Endocardium | | NS | NS | NS | NS | p Values for comparison of interobserver radial length measurements

| | | | | | |
|---|---|---|---|---|---|
| Epicardium | 0.0005 | 0.0005 | 0.0005 | 0.0005 | 0.0005 |
| Endocardium | 0.005 | 0.005 | 0.005 | NS | 0.005 |

NS, Not Significant.
*All radial measurements are made in pixels.

The mean interobserver differences for the endocardium change very little as the mask size is increased. As shown in Table 3, no statistical difference was found between these mean differences at any mask size compared with measurements made on the original images. However, the third section of Table 3 shows that the raw radial length measurements between the observers were not statistically different (at the p<0.05 level) at the 9×9 mask size.

Discussion

This Example describes a method for assessing image "improvement" after the application of enhancement operations. The independent variables defining this peak-to-background function are as follows:

1) The center point of the left ventricle in the two-dimensional echocardiographic parastemal short-axis view;
2) The width of the horizontal and vertical bands;
3) The form of the derivative applied to the cumulative gray level distributions to determine the zero crossings, that is, the position of the peaks;
4) The minimum accepted distance between peaks;
5) The accepted shoulder height of the peaks which determines the width of each peak; and
6) The threshold area for an accepted peak.

Although the determination of these variables is largely empirical, the values chosen and reported here result in a close agreement between an increase in the peak-to-background ratio and the opinions of two skilled echocardiographers that one image is preferred to another. The criteria chosen are dependent on the resolution of the images processed. The width of the derivative and distance between accepted peaks would have to be changed with higher resolution analog-to-digital conversion and with expanded gray scale depth.

The only independent variable that remains subjective is the identification of the center point of the left ventricle. The calculated peak-to-background ratio is very dependent on the condition that the walls of the left ventricle are perpendicular to the band in which the cumulative gray level curve is formed. If the center point is not placed in a position so that the endocardium and epicardium are perpendicular to the horizontal and vertical diameters through that point, then the peaks of the cumulative intensity curves will be spread out and thus less sharply defined. It follows that the short-axis view should be obtained so that the endocardial and epicardial borders are as close to circular as possible and also that the center point be chosen carefully.

The usefulness of the peak-to-background ratio has been demonstrated on the basis of several observations:
1) The optimal image improvement, as subjectively evaluated by the echocardiographers, was the result of application of the 9×9 Laplace operation and this corresponded to the last significant increase in the peak-to-background ratio;
2) the criteria chosen result in the majority of defined peaks being on structure;
3) enhancement by use of the optimal mask size results in more defined peaks in both the horizontal and vertical directions;
4) enhancement by use of the optimal mask size results in an increase in the percentage of peaks residing on structure in the horizontal direction, and
5) evidence of increased measurement precision was found in the enhanced images that were preferred by the observers and that corresponded to the last significant increases in the peak-to-background ratios.

The development of the peak-to-background ratio was not meant to be an end in itself and was not intended to be an absolute measure of image quality but only an estimate. As mentioned above, several of the empirical conditions for the calculation of the peak-to-background ratio, such as the number of pixels separating peaks, would have to be changed depending on the resolution of the scan conversion and on the gray scale depth. Such changes in these variables can be made in a software program within certain preset limits. Therefore if the calculated peak-to-background ratio on an image should be below a given threshold value, different processing schemes (increasing Laplace mask sizes may be one option) may be tried under program control to determine whether more definable peaks can be brought out.

If no improvement or only modest improvement in the peak-to-background ratio is seen, then a possible conclusion would be that the image is of insufficient quality for quantitation in that region.

Such estimates can be made quite early in processing. The position of peaks representing potential edge points in the horizontal direction are superimposed on the image. Thus, even before scan conversion some optimization of preprocessing with use of the peak-to-background ratio as a feedback may be possible. Theoretically, the polar format would be more preferable because in this setting the true difference in axial and azimuthal resolution are present and can be approached with some degree of independence.

5.2 Example 2

Automatic Identificaiton of Papillary Muscles in Left-Ventricular Short-Axis Echocardiographic Images When screening left ventricular short-axis echocardiographic images. cardiologists partly depend on the wall motion and the wall thickness to make an assessment about the patient's cardiac function. Even though computation of wall motion and wall thickness are a simple task, if the endocardial and epicardial borders have been found, efforts at real-time (or near-real time) quantitation have met with limited success.

While a commercially available system has a feature referred to as Automated Border Definition (ABD), the feature uses a threshold method based on the integrated backscatter to identify edges throughout the entire image. As with any threshold method, the ABD feature can be visualized as a method that uses the ultrasound backscatter to create a new surface which has value one at locations with intensity above threshold (tissue) and zero at locations with intensity below threshold (blood). Since it does not perform any higher level tasks of selecting desired edges, rejecting undesired edges, and filling gaps to form continuous borders, an observer must outline the region in which quantitation is to be performed. Thus, the method is actually semi-automated. Since the epicardial and endocardial borders are not identified, the feature is neither able to estimate regional wall motion nor perform wall thickening estimates (Stuhlmuller et al., 1992).

For the reasons stated in the preceding paragraph, it is important to make the distinction between the terms edge detection and border determination. The term edge detection should be used to refer to a mathematically defined method for identifying locations where there is a discontinuity in the image surface (i.e., a discontinuity in the first or second derivative). In the ABD feature as well as other such methods, unwanted high-intensity values such as papillary muscle or even noise are frequently identified as structures of interest. On the other hand, the term border determination should be reserved for a method that estimates the locations in the image representing the actual anatomical epicardial or endocardial borders. In echocardiographic images it is frequently the case; that the location of many portions of the border (such as the lateral walls) are represented by low-intensity values or even dropout. Since no discontinuity of the threshold surface will be detected by the ABD method, these borders will unfortunately be missed.

Image data variability, speckle (noise), lateral dropout, translational motion, as well as a variety of abnormalities such as pericardial effusion, volume and pressure overload, and hypertrophy add to the complexities of automatically approximating the borders. In addition, the presence of such intracavity structures as chordae tendineae, valves, and papillary muscles, further contribute to the difficulty of obtaining accurate boundary approximations. Since the accepted convention for drawing the left-ventricular endocardial contour is to exclude the papillary muscles from the border, the main reason for the inventors' interest in searching for the papillary muscles is to improve the reliability of future automatic algorithms by developing techniques to identify and exclude these structures of secondary interest. In this Example, the focus is restricted to the problem of identification of papillary muscles in midchamber echocardiographic slices obtained from healthy adults.

5.2.1 Methods

5.2.1.1 Image Acquisition

The short-axis images used in the present study were generated on an Advanced Technology Laboratories Ultramark 8 cardiac ultrasound system (Advanced Technology Laboratories, Inc., Bothell, Wash.). This device creates and saves blocks of data in units of 16 frames/block. Each frame is saved in polar format as a matrix with 512 rows, 128 columns, and 256 gray levels. Each column represents the data acquired along a particular scan-line. After acquisition, the images were stored and processed off-line on an IBM RS/6000 workstation. When stored on a disk drive, each block requires approximately one megabyte of memory. Scan conversion from polar to Cartesian coordinates produces an image of 240 rows by 244 columns.

5.2.1.2 Ultrasound Image Formation

One of the main considerations of the device is that each time the ultrasound wave meets the boundary of two tissues, a portion of the wave is reflected at the interface while the remainder is propagated into the second tissue. To act as a specular reflector, it is necessary that the interface is greater in size than the wavelength of the incident sound. It is also necessary that the surface is smooth. When these conditions are met, the intensity of the reflected wave is given by $$I_r = I_i \left(\frac{Z_2 - Z_1}{Z_2 + Z_1}\right)^2$$

where r denotes the reflected wave, i denotes the incident wave, and $Z_k$ k=1, 2 denotes the characteristic impedance of the respective tissues (Geiser and Oliver, 1986). Given the above formula, the larger the difference of characteristic impedances between papillary muscle and blood, the higher the reflected proportion of the incident energy will patient and on the scan view. As a subject ages or develops heart disease, papillary muscles tend to calcify exhibiting higher impedances and thus higher reflectance. Depending on the patient's health, age, and physical condition, impedances may actually fluctuate from that of a soft tissue ($1.62*10^6$ $Kg^{-2}s^{-1}$) to that of a muscle ($1.71*10^6$ $Kg^{-2}s^{-1}$) (Havlice and Taenzer, 1979; Shung, 1987). Since blood has a characteristic impedance of approximately ($1.61*10^6$ $Kg^{-2}s^{-1}$) reflected energy from the interface between papillary muscle and blood varies widely. By altering the scan view, both the papillary muscle impedance and the (2-D) geometry of the papillary muscle in the formed image change. Depending on the scan view, the papillary muscles may actually appear in a variety of different configurations including both papillary muscles in view, one papillary muscle in view, neither of the papillary muscles in view, papillary muscles and chordae tendineae in view, papillary muscles adjacent to the endocardial border, and papillary muscles separated from the endocardial border. Additional variations in the appearance of the papillary muscles can be caused by different gain settings of the device, a variety of cardiac abnormalities, as well as translation and rotation of the heart.

5.2.1.3 Description of the Method

The methods presented here for the automatic identification of papillary muscles in (2-D) short-axis left-ventricular images is presented in three parts: spatial preprocessing, spatial processing, and temporal processing.

5.2.1.3.1 Spatial Preprocessing

During spatial preprocessing, the geometric features that constitute the papillary muscles are enhanced. To enhance these features, spatial preprocessing consists of the following two steps: a) region of search formation and b) contrast enhancement.

5.2.1.3.1.1 Region of Search Formation

The technique of Wilson et al. is employed to provide the approximate location of the center as well as estimates of the posterior and anterior epicardial borders for both the end-diastolic and end-systolic frames (Wilson et al., 1993). Similarly, the method is used to provide the approximate locations of the lateral epicardial walls. For any image sequence with N frames, there are N regions of search (ROS's) that may contain the left papillary muscle and N ROS that may contain the right papillary muscle. Initially, two ROS's are approximated for each side: one for the end-diastolic and one for the end-systolic frame. These initial ROS approximations are based on percentages of the radii of the epicardial border position estimates, and their derivation is largely empirical. The percentages are independent of heart size and solely depend on the accurate approximation of the epicardial border which is essential for the determination of the ROS. The remaining regions, on frames between ED and ES, are established by linearly interpolating the above estimates. During contraction of the cardiac muscle, the papillary muscles tend to move upward as well as inward. Thus, the ROS for the end-systolic frame is expanded upwards away from the automatically estimated center. The method proceeds as follows:

Step 0) Let $(x_0, y_0)$ denote the center of the left ventricle found by the computer. Let $E_a$ denote the distance from the center to the anterior epicardial-border estimate and $E_p$ denote the distance from the center to the posterior epicardial-border estimate. Let $E_l$ and $E_r$ denote the distances from the center to the left and right lateral epicardial borders, respectively. Let $(x_1, y_1)$, $(x_2, y_2)$ denote the upper-left and lower-right coordinate pairs of a rectangle that defines the left ROS in the image. Let $(x_3, y_3)$, $(x_4, y_4)$ be the upper-left and lower-right coordinate pairs of a rectangle that defines the right ROS in the same image.

Step 1) Estimate the left ROS in the end-diastolic frame as follows:

$x_1 = x_0 - 0.60*E_l$ $y_1 = y_0 - 0.05*E_a$ $x_2 = x_0$ $y_2 = y_1 + 0.35*E_p.$

Estimate the left ROS in the end-systolic frame by modifying $y_1$ as follows:

$y_1 = y_0 - 0.10*E_a.$

Step 2) Estimate the right ROS in the end-diastolic frame as follows:

$x_3 = x_0$ $y_3 = y_0 - 0.05 * E_a$ $x_4 = x_0 = 0.60 * E_r$ $y_4 = y_3 + 0.35 * E_p$.

Estimate the right ROS in the end-systolic flame by modifying $y_3$ as follows:

$y_3 = y_0 - 0.10 * E_a$.

Step 3) Approximate the ROS for all intermediate flames by linearly interpolating from the end-diastolic to the end-systolic frame.

The objective is to contain the left and the right papillary muscles within the ROS for the image sequence. An accurate estimate of the center point, anterior, posterior, and lateral epicardial borders for both the frame at opening end-diastole and the frame at end-systole is thus essential.

5.2.1.3.1.2 Contrast Enhancement

The method, introduced by Beghdadi and Negrate, enhances the image based on local detection of edges (Beghdadi and Negrate, 1989). The technique, described below, is a modification of an idea of Gordon and Rangayan (Gordon and Rangayan, 1984). The method measures the edge gray level at a pixel location by processing the pixel values of its nine immediate neighbors. The ROS are processed as follows:

Step 0) Let X(i, j) denote the gray value at location (i, j) in the image.

Step 1) Let the pair (k, l) denote any fixed location in the image.

Step 2) Let W(k, l) denote the 3×3 subimage centered at (k, l).

Step 3) Compute the mean, m(k, l), of the eight nearest neighbors of (k, l) in W(k, l).

Step 4) Compute the edge value, L(i, j), for each pixel (i, j) in W(k, l) by the rule $L(i,j) = |X(i,j) - m(k,l)|$ where |x| denotes the absolute value of x.

Step 5) Compute the mean edge gray level, E(k,l), in W(k,l) defined by the rule $E(k,l) = S[L(i,j) * X(i,j)]/S[L(i,J)]$.

Step 6) Compute the contrast, C(k, l), by the formula $C(k,l) = |X(k,l) - E(k,l)|/|X(k,l) + E(k,l)|$ Step 7) Let the new contrast, C'(k, l) be denoted by the rule $C'((k,l) = \sqrt{C(k,l)}$.

Step 8) Given the new contrast, C'(k, l), and the mean edge value, E(k, l), estimate the new gray intensity, X'(k, l), at image location (k, l) as follows: If X(k, l) is less than or equal to E(k, l), then let $X'(k,l) = E((k,l) * [(1 - C'((k,l))/(1 + C'(K,l))]$.

Otherwise, let $X'(k,l) = E((k,l) * [(1 - C'((k,l))/(-1C'(K,l))]$.

Beghdadi and Negrate compared the described contrast enhancement algorithm to Gordon's method (Gordon and Rangayan, 1984), local uniform equalization. Rayleigh gray level distribution, histogram hyperbolization, and exponential transfer-function gray level distribution and have shown higher efficiency and better results. In addition, they have shown the technique to contrast enhance the image without any significant enhancement of noise (Beghdadi and Negrate, 1989). Comparison of methods was performed both on real and computer simulated images.

5.2.1.3.2 Spatial Processing

The objective of spatial processing is to associate each papillary muscle with a single point. The algorithm proceeds in five steps: a) existence test, b) binary-image formation, c) closing operation, d) data-cluster identification, and e) papillary-point selection.

5.2.1.3.2 Existence Test

Following contrast enhancement, an attempt is made to verify the existence of the papillary muscle within each ROS. The objective is to differentiate between noise, small intracavity structures such as chordae tendineae and the papillary muscle. Since the standard deviation is a measure of data variability, a method has been devised to approximate the minimum-allowable standard deviation within each ROS. If the method's standard deviation is larger than the ROS standard deviation, it is concluded that the papillary muscle is not in view since the data within the ROS do not meet the criteria of expected variability. To measure the minimum-allowable standard deviation for each ROS, a histogram is built that consists of only two gray level intensities: one gray intensity representing cavity picture elements (pixels) while the other representing papillary muscle picture elements. The selection of the two gray levels provides the means for setting the smallest expected gray level difference between the papillary muscle and the cavity while the number of pixels assigned to each of the two gray level intensities provides the means for setting the smallest expected papillary muscle size. The two gray levels of the histogram and the number of pixels assigned to each level are empirically derived as follows: Since most of the ROS is within the cavity of the left ventricle, the empirical assumption is made that a visible papillary muscle will at least embody one-eighth of the ROS pixels. Any structure that will embody less than one-eighth of the ROS is assumed to either be noise, part of the cardiac wall, or some intracavity structure other than papillary muscle. Consequently, the remaining seven-eighths of the data will embody cavity. The proportions of one-eighth and seven-eighths are largely empirical but reflect an effort to exclude the smaller structures, such as chordae, being identified as papillary muscles. To determine the two gray intensities for minimum-allowable gray level difference between papillary muscle and cavity, the technique first acquires the maximum and the minimum gray level intensities within the ROS. Next, one-eighth of the dam, labeled as papillary muscle, is assigned the maximum gray intensity. The remaining seven-eighths, labeled as cavity, are assigned the gray intensity Cavity $GI$ = minimum $GI$ + (maximum $GI$ + minimum $GI$)/2 where GI is the level intensity of ROS.

Following histogram construction, the algorithm estimates the histogram standard deviation and the ROS standard deviation. As described above, the comparison of the two standard deviations provides the means for the papillary muscle existence test.

5.2.1.3.2.2 Binary-Image Formation

After each ROS has been contrast enhanced and passed the existence test, binary images are formed. The threshold for binary image formation is estimated from the mean plus one-half the standard deviation of the gray level intensities within the ROS. One-half of the standard deviation has been selected because there is no guarantee of a Gaussian distribution within the ROS. This implies that it is highly likely that a threshold based solely on the mean will select most of the ROS points as papillary muscle. In contrast, a threshold based on the mean plus one standard deviation will be highly likely to select very few or no points as papillary muscle. A threshold based on the mean plus one-half of the standard deviation will contain just enough points to justify the one-eighth empirical assumption made by the existence test.

Step 05 Let I denote the image within a ROS.

Let $X(i, j)$ denote the gray intensity at image location $(i, j)$

Let $m(I)$ denote the mean value of I.

Let $s(I)$ denote the standard deviation of I.

Step 1) Estimate the threshold, $T(I)$, by the rule $$T(I)=m(I)+05*s(I).$$

Step 2) Form binary images as follows: If $X(i, j)$ is greater than or equal to $T(I)$, then let $X(i, j)=1$; otherwise let $X(i, j)=0$.

5.2.1.3.2.3 Closing Operation

The closing operation consists of a dilation followed by an erosion of the binary images. Since the expected wall thickness is 10 to 20 pixels, the method uses a 5×5-neighborhood kernel. A smaller size kernel would not effectively connect structures while a larger kernel would blend intracavity structures into the wall. The goal of the closing operation is to connect data clusters that are in close proximity. By applying the closing method, larger data clusters are created within the cavity and speckle is reduced. Following dilation, the binary images are eroded using a 5×5-neighborhood kernel.

5.2.1.3.2.4 Data-Cluster Identification

The contrast enhancement, binary image formation, and closing operations have resulted in binary images where gray intensity of zero corresponds to cavity and gray intensity of one to all other intracavity structures. Following the closing operation, the algorithm identifies the papillary muscle data cluster. The method employs a connected components technique. More specifically, the Depth-Search First (DFS) algorithm is applied (Manber, 1989). Since data clusters may be disconnected, DFS runs on all disconnected data clusters separately. By employing this connected components method, the following information is obtained:

The number of data clusters in the ROS is known.

The size of every data cluster is identified.

Every pixel location is associated with a specific cluster.

According to the relative data cluster size and the number of clusters detected within the ROS the following classification categories emerge: 1) No data clusters in ROS. The algorithm determines that there is no papillary muscle within this ROS. 2) A single data cluster in ROS. The algorithm selects the sole data cluster as the papillary muscle data cluster. 3) Multiple data clusters in ROS. Due to the presence of noise, intracavity structures, and cardiac wall within the ROS, the thresholding and closing operations have produced binary images where no assumption can be made about the relative orientation or geometry of papillary muscle data clusters. The algorithm has to select the papillary muscle data cluster based solely on its relative size to other data clusters. If the data clusters are of similar size, the task of selecting the papillary muscle data cluster becomes difficult. Data clusters of similar size may represent cardiac wall, noise, chordae tendineae, or papillary muscle and are all equally likely to be selected as papillary muscle. Therefore, if two or more clusters have similar sizes, the algorithm is prevented from identifying the papillary muscle data cluster. This is accomplished by introducing the 70-5 empirical criterion which aids in the identification of the most prominent data cluster. The 70-5 empirical criterion states the following:

The most prominent data cluster consists of at least 70% of ones in the binary image and is identifiable if a total of five or less data clusters exist within the ROS.

The 70% empirical criterion aids in the selection of the largest data cluster within the ROS while the five data cluster empirical criterion aids in the elimination of data clusters of similar size. Same size data clusters will occur inside the ROS when noise, other intracavity structures, or a part of the cardiac wall contain high gray level intensities impossible to eliminate via thresholding. It is also possible that a data cluster satisfies the 70% criterion but more than five data clusters exist in the ROS. Not well defined intracavity structures such as noise, chordae tendineae, and papillary muscles tend to break into multiple data clusters when a well defined cardiac wall is within the ROS. The five data cluster criterion prevents the cardiac wall data cluster from being identified as the most prominent papillary muscle data cluster when other structures are not easily identifiable within the ROS.

5.2.1.3.2.5 Papillary-Point Selection

Following identification of the papillary muscle data cluster, the borders of the data cluster are detected. Given a 3×3 neighborhood kernel, the center point of the kernel is part of the border if any of its eight neighbors belongs in the cavity. After border identification, a single point is selected to represent the papillary muscle. The left and the right papillary muscle points are identified simultaneously. If both the left and the right papillary muscle data clusters exist, then the three points that minimize the sum of the distances between the left data cluster border, the right data cluster border, and the automatically detected center (Wilson et al., 1993) of the left ventricular cavity are selected. In contrast, if only one papillary data cluster is detected, then the point that minimizes the distance between the data cluster border and the automatically detected center (Wilson et al., 1993) of the left ventricular cavity is chosen.

5.2.1.3.3 Temporal Processing

Thus far, spatial processing has resulted in coarse papillary muscle point approximations. During temporal processing, the method evaluates the motion pattern of these papillary muscle points and attempts not only to correct any poor point estimates but also to fill-in missing points. There are two steps to this process: a) motion-pattern formation, and b) poor-point estimate correction.

5.2.1.3.3.1 Motion-Pattern Formation

A motion pattern is formed by analyzing each side of the approximated papillary muscle point locations through time. Hence, there are two motion patterns formed in any image sequence: one for the left and one for the right papillary muscle point estimates. The algorithm proceeds to form the motion patterns as follows:

Step 0) Let $(x_l, y_l)$ and $(x_r, y_r)$ the coordinate pairs that denote the x and y locations of the papillary-point estimates for the left and the right muscles, respectively.

Let $L_{lls}$ denote the least squares line, $y_l=a_l x_l+b_l$, calculated from the left papillary-point estimates through time (Scheaffer and McClave, 1986).

Let $L_{rls}$ denote the least squares line, $y_r=a_r x_r+b_r$, calculated from the right papillary point estimates through time (Scheaffer and McClave, 1986).

Step 1) Calculate the orthogonal projections, $(x'_l, y'_l)$ and $(x'_r, y'_r)$ of the points $(x_l, y_l)$ and $o(x_r, y_r)$ onto their respective least squares lines $L_{lls}$ and $L_{rls}$.

Step 2) Let $(x'_{l(i)}, y'_{l(i)})$ and $(x'_{l(i+1)}, y'_{l(i+1)})$ denote the orthogonal projections of the left papillary points on frames i and i+1, respectively.

Step 3) Estimate the range of motion of a left papillary muscle point, at frame i, on both the x and the y coordinates $(dx_{l'(i)}, d_{y'(i)})$ as follows:

$$dx_{l'(i)} = |x'_{l(i)} - x'_{l(i+1)}|$$

and $$dy_{l'(i)} = |y'_{l(i)} - y'_{l(i+1)}|.$$

Repeat the process for all subsequent frames.

Step 4) Similarly, estimate the range of motion of all the right papillary muscle points.

5.2.1.3.3.2 Poor-Point Estimate Correction

From the above coordinate-pair differences, the method evaluates the continuity of motion of the roughly estimated papillary muscle points. This task is achieved by setting a motion threshold. Any point that exceeds this threshold is considered a poor-point estimate and is linearly interpolated from its neighbors. The motion threshold is based on the most reliable diameter approximations for the image sequences: the estimates of the anterior and posterior epicardial walls on the opening end-diastolic frame. A papillary muscle point is allowed a projected interframe motion of no more than 5% of the vertical-epicardial diameter. If the projected motion is greater than 5%, then the papillary point is considered a poor-point estimate. A maximum of up to four consecutive poor-point estimates is linearly interpolated: otherwise, no interpolation takes place.

5.2.1.4 Method of Exaluation

The study involved two independent expert observers. The first expert observer selected 70 mid-chamber image sequences of excellent and good quality. The image sequences were acquired at a clinical setting and are typical ultrasound images of healthy adults. An image sequence was considered of a good or excellent quality if at least 75% of the endocardial borders where visible. The second expert was presented with the end-diastolic, the mid-systolic, and the end-systolic frames for each image sequence for a total of 210 frames. He was then asked to identify the papillary muscle by selecting a single point on the interface between the muscle and the cavity. The option was provided to view image sequences in motion as well as on a frame by frame basis. Hence, there were two-point approximations for each frame for a total of 420 approximations.

Papillary point estimates made by the computer were compared against estimates made by the independent expert observer. The criteria for excellent, good, and poor computer estimates were set as follows:

Step 0) Let $E_a$, and E denote the distances from the center to the anterior and posterior epicardial-border estimates, respectively, for the end-diastolic frame.

Let $E'_a$ and $E'_p$ denote the distances from the center to the anterior and posterior epicardial-border estimates, respectively, for the end-systolic frame.

Step 1) Estimate $E''_a$ and $E''_p$ for the mid-systolic frame by linearly interpolating from $E_a$ to $E'_a$ and $E_p$ to $E'_p$ respectively.

Step 2) Estimate the end-diastolic ($ED_d$), end-systolic ($ES_d$), and mid-systolic ($MS_d$) vertical epicardial diameters as follows:

$$ED_d = C_a + E_p$$

$$ES_d = E'_a + E'_p$$

$$MS_d = E''_a + E''_p$$

Step 3) A computer estimate for the end-diastolic frame is considered excellent if the automatically identified papillary point is within a circle of radius equal to 5% of $ED_d$. Similarly, a computer estimate is considered good if it lies outside the excellent region but is within a circle of radius equal to 10% of $ED_d$. A poor approximation is considered one that lies outside both the excellent and good regions.

Estimates for the mid-systolic and end-systolic frames follow similar criteria but using the MSa and $ES_d$ distances respectively.

The criteria for excellent, good, and poor computer approximations is based on the most accurate estimates of the epicardial wall: namely, the epicardial estimates of the posterior and anterior wall (Wilson et al., 1993). These estimates provide the vertical epicardial diameters that are used for the best error approximation between the computer and the independent expert observer. The 5% and 10% criteria are selected based on the relative size of the myocardial diameter measured vertically. The heart size of a healthy adult measures an average of 120 pixels from posterior to anterior epicardial border. The computer will provide an excellent approximation for an estimate that is within six pixels from the expert observer's estimate.

5.2.2 Results

The method was applied on three frames for each of 70 image sequences for a total of 210 frames. Since there are at most two papillary muscles appearing in each frame, there were 420 decisions made by the computer and the independent expert observer. The expert observer's estimates are at the center of the concentric circles which indicate regions of excellent and good approximations. According to the criteria for success explained in Section II-C4), the radii of the inner and outer circles are 5% and 10% of the epicardial vertical diameter, respectively. The area of the inner circle represents all possible excellent approximations, while the region in between the inner and outer perimeters represents all possible good approximations.

5.2.3 Summary

Over the past decade, emphasis has been placed on removing the subjectivity of clinical evaluation of echocardiographic images and developing a system that will automatically quantify the cardiac function. Since wall thickness, chamber area, and area change fraction are important cardiac-function indexes, the system will have to provide reliable and accurate estimates of the left-ventricular endocardial and epicardial borders. Even though identification of epicardial borders is confounded by lateral dropout, signal scattering due to reflection, heart translation, and the presence of the right ventricular attachment, endocardial borders are more susceptible to approximation errors. In addition to noise, lateral dropout, and low impedance difference between the blood and the heart muscle, the presence of such intracavity structures as chordae tendineae, valves, and papillary muscles contribute to the difficulty of identification of the endocardial borders.

When tested on excellent and good quality image sequences (acquired at the mid-papillary muscle level in subjects with normal cardiac function), the method correctly identified the papillary muscles 81% of the time. The process proved more reliable on the left side of the ventricle. This is likely due to left-lateral dropout occurring more frequently in this data set; thus providing a clearer view of the left papillary muscle. In spite of attempting to acquire images at the mid-papillary muscle level, the identification of the right papillary muscle point was frequently confounded by the presence of chordae tendineae, thus providing multiple intracavity structures within one ROS. Other reasons for poor estimates include low reflectance due to the low angle of incidence of the ultrasound beam with the muscle surface, heart rotation, heart translation, and noise in the cavity. Poor reflectance resulted in failure of the existence test to identify the presence of some papillary muscles. Rotation and translation affected the center determination and therefore the ROS estimates. Finally, noise in the cavity resulted in a higher than expected number of isolated data clusters within the ROS which automatically terminated processing.

5.3 Example 3

Evidence for a Relation Between Inspired Gas Mixture and the Left Ventricular Contrast Achieved with Albunex® in a Canine Model Ultrasounid contrast agents nave been an exciting development in the field of echocardiography. Albunex® is a suspension of sonicated 5% human plasma albumin. Safety and efficacy studies (Monaghan et al., 1993), in both animals and humans, have shown variable opacication achieved with Albunex®. In the inventors' laboratory, preliminary studies with Albunex® were conducted in a spontaneously breathing dog preparation, with anesthesia maintained with 1.2% isoflurane in 100% oxygen. In the initial animal study, very little contrast effect from Albunex®, even at doses of 0.88 ml/kg, were seen. The inventors concluded that this decrease in contrast effect or microsphere survival was most likely due to the concentrations of the gases in the inspired gas mixture. This Example shows that the left ventricular (LV) brightness achieved with a constant-dose, intravenous injection of Albunex varies with the $FI_{O_2}$ in the canine preparation.

5.3.1 Methods

5.3.1.1 Animal Preparation

Mongrel dogs (n=3), weighing between 21.3 and 27.5 kg (mean weight 25.0 kg), were prepared for Albunex® injection. The animals were sedated with subcutaneous morphine. Intravenous access via the cephalic vein was obtained and anesthesia induced with intravenous thiopental. Endotracheal intubation was performed for airway protection and to allow control of the inspired gas composition; however, spontaneous respiration was maintained throughout the study. General anesthesia was sustained with 1.2 to 1.4% inhaled isoflurane. Further access for monitoring purposes was then obtained. A Millar multisensor micromanometer catheter was introduced into the carotid artery with pressure sensors positioned in the left ventricle and aortic root. A Swann-Ganz catheter was introduced into the internal jugular vein and positioned in the pulmonary artery. Arterial blood samples were obtained through a femoral artery catheter.

Baseline measurements of hemoglobin concentration, cephalic vein, pulmonary artery, femoral artery blood gas concentrations, as well as baseline hemodynamic data including LV, aortic root, and pulmonary artery pressure were obtained. Lead II of the electrocardiogram was used to monitor heart rate and rhythm. All parameters were obtained at baseline as well as before and after each contrast injection. Albunex® was administered in a bolus via the cephalic vein catheter. The dosage was held constant at 0.08 ml/kg. Oxygen concentration of the inspired gas mixture was monitored (VTI Oxygen Analyzer/Monitor, Vascular Technology Inc., Chelmsford, Mass.) and carefully controlled. Using a mixture of oxygen and nitrogen, $FI_{O_2}$ was varied between 10 and 50% in steps of 10%. The $FI_{O_2}$ was monitored continuously after each change and held constant for a 15-min equilibration period. The order of change in the $FI_{O_2}$ concentrations was randomized. In two animals, single injections of 0.22 ml/kg were given at 40% $FI_{O_2}$ to see if the LV contrast effect increased with an increased dose at this elevated $FI_{O_2}$. Animals were sacrificed using an injection of saturated KCl solution at the termination of the study. The experimental protocol and methods were re-viewed and approved by the Institutional Animal Care and Use Committee at the University of Florida and conform to the position of the American Heart Association on research animal use.

5.3.1.2 Concentration of Inspired Gases

The inspired gas concentrations were calculated according to the following relation:

$$\text{Total} = FI_{O_2} + FI_{N_2} + FI\text{Isoflurane} + \text{water vapor pressure}.$$

The partial pressures of nitrogen in the blood were calculated using the relation:

$$PN_2 = 760 - P_{O_2} - P_{CO_2} - P\text{ Isoflurane},$$

where the P Isoflurane was assumed to be 1.2 or 1.4% of 760 mmHg.

5.3.1.3 Ultrasound Examination

Two-dimensional echocardiographic images were obtained using standard transthoracic techniques. Imaging was performed using an ATL model UM-9 ultrasound system. The dogs were placed in a right decubitus position and imaging was performed with a 2.25, 3.0, or 5 MHz phased array transducer. An optimal parastemal short-axis image at approximately the mid papillary muscle level was obtained. The transducer was clamped in position on a reinforced stand which avoided movement of the transducer in relation to the animal for any series of injections and $FI_{O_2}$ variations. Image position, gain settings, and depth were optimized at the beginning of each injection sequence and not manipulated subsequently. All images were stored on VHS video cassettes. Images were obtained at the beginning of the study and from 15 s prior to each contrast injection until two min after each injection. The echocardiogram was visually monitored continuously throughout the study.

5.3.1.4 Image Analysis

The videotaped sequences were digitized (256×240 pixels, 256 gray levels) using an off-line analysis workstation (Nova/Microsonics, Allendale, N.J.). Sixty-four sequential end-diastolic (ED) frames obtained beginning at the time of peripheral injection of contrast were digitized. In each dog, control frames were obtained from the baseline period prior to any injections. Digitized images were then transferred via ethernet to the IBM RISC 6000 computer (IBM, White Plains, N.Y.) to the echocardiography research laboratory for analysis. An automated densitometry computer algorithm was developed to process the data.

The automated algorithm uses a previously reported methods (Wilson and Geiser, 1993) for the fully automated approximation of the position of the epicardial and endocardial boundaries of the left ventricle and the right ventricular (RV) outflow tract in the parasternal short-axis view. The latter region was trapezoidal in shape.

To ensure that the LV endocardial border and the RV out-flow tract region of interest were properly registered on all frames throughout the respiratory cycle, the position of the posterior epicardium on each frame following injection was calculated and the regions of interest translated by the difference in position compared with the position on the first control frame. This translation can be thought to be much like the balancing of a ball on the nose of a seal.

The mean pixel intensity for the LV chamber and the RV outflow tract was calculated automatically for each of the 10 control end-diastolic frames (background brightnesses) and for the 64 end-diastolic frames following Albunex® injection. This resulted in a time-mean pixel brightness curve for each injection. Continuous visual monitoring of the echocardiogram after completion of the recording of 64 diastolic frames revealed no late accumulation of contrast in any case. Subsequently the maximum RV mean pixel brightness was recorded and the area under the RV time-brightness curve was calculated for each injection. Calculations were made for the left ventricle, the minimum intensity, the maximum intensity, the area under the LV brightness curve above background, and the number of end-diastolic frames during which the mean cavity brightness was above background.

5.3.1.5 Statistical Considerations

The experimental data consist of a total of 16 injections in three animals. Since the injections in all three animals had shown similar subjective (i.e., visual) response to variation in the $FI_{O_2}$, it was decided to perform an interim statistical analysis before proceeding with further studies. If the data established significant differences in image brightness related to $FI_{O_2}$ variation, that is, they statistically supported the hypothesis, then no further animals would need to be sacrificed. If the results did not show significant relationships, then the number of additional studies necessary to reach a conclusive statistical decision by power analysis could be estimated.

5.3.1.6 Statistical Methods

The p values for testing the relationship between various brightness indicators. inspired gas concentrations, blood gas partial pressures, pulmonary artery pressure, LV systolic and end-diastolic pressures, and aortic pressure were obtained from a simple linear recession model for each of the three dogs. For each comparison, the overall p value for the three animals combined was obtained from a fundamental theorem of linear models (Rao, 1965) by confirming that the standard deviations (SD) of the errors in the linear models were the same. A test for SD equality was performed before combining the data. For variables where there was strong evidence that the SDs were different, the overall p value was not computed. Significance was assumed with a p value of <0.05.

5.3.2 Relults

Data for the inspired gas concentrations and for RV and LV brightness measures are given in Table 5. Negative correlations of r=−0.92, r=−0.86, and r=−0.87 between the $FI_{O_2}$ and this area were found for Dogs 1, 2, and 3, respectively. For the three dogs combined, the overall negative correlation has a p value of 0.003.

A similar relationship was identified for the maximum brightness measured in the left ventricle during the opacification phase. Negative correlations of r=−0.99, r=−0.76, and r=−0.91, for Dogs 1, 2, and 3, respectively, were obtained. When the three animals are combined, the overall p value is 0.001.

For the brightness nadir in the left ventricle, positive correlations of r=0.93, r=0.86, and r=0.38 were found for Dogs 1, 2, and 3, respectively. The combined data from all three animals show that a significant correlation can be claimed at p=0.003.

TABLE 5

INSPIRED GAS MIXTURES, LEFT VENTRICULAR AND RIGHT VENTRICULAR BRIGHTNESS CHARACTERISTICS FOR ALL RANDOMIZED INJECTIONS

| Animal | Injection | Inspired gas concentrations | | | Blood gases | | Peak LV pressure | LV mean pixel intensity | | | RV mean pixel intensity | |
|---|---|---|---|---|---|---|---|---|---|---|---|---|
| | | $FI_{O2}$ (%) | $FI_{N2}$ (%) | $FI_{IF}$ (%) | $CV_{O2}$ (mmHg) | $FA_{O2}$ (mmHg) | (mmHg) | Min | Max | Area | Max | Area |
| Dog 1 | 1 | 12.0 | 86.8 | 1.2 | 63 | 64 | 125 | 5 | 99 | 1919 | 121 | 1688 |
| | 2 | 40.0 | 58.8 | 1.2 | 120 | 199 | 134 | 12 | 20 | 79 | 119 | 1028 |
| | 3 | 12.7 | 86.1 | 1.2 | 59 | 62 | 138 | 3 | 89 | 1926 | 98 | 781 |
| | 4 | 20.5 | 78.3 | 1.2 | 87 | 96 | 126 | 4 | 69 | 658 | 104 | 1489 |
| Dog 2 | 1 | 22.4 | 76.2 | 1.4 | 66 | 74 | 102 | 28 | 71 | 565 | 50 | 294 |
| | 2 | 30.0 | 68.6 | 1.4 | 82 | 97 | 104 | 27 | 71 | 742 | 51 | 180 |
| | 3 | 40.0 | 58.6 | 1.4 | 94 | 119 | 106 | 30 | 48 | 146 | 50 | 201 |
| | 4 | 12.4 | 86.2 | 1.4 | 44 | 44 | 118 | 26 | 70 | 906 | 53 | 239 |
| Dog 3 | 1 | 21.2 | 77.6 | 1.2 | 62 | 60 | 106 | 24 | 104 | 1772 | 81 | 653 |
| | 2 | 40.7 | 58.1 | 1.2 | 160 | 199 | 101 | 23 | 77 | 674 | 77 | 572 |
| | 3 | 25.2 | 73.6 | 1.2 | 100 | 111 | 100 | 23 | 100 | 1777 | 87 | 526 |
| | 4 | 30.0 | 68.8 | 1.2 | 101 | 138 | 98 | 21 | 90 | 1373 | 79 | 637 |
| | 5 | 12.4 | 86.4 | 1.2 | 46 | 50+ | 102 | 24 | 99 | 1545 | 81 | 606 |
| | 6 | 35.0 | 63.8 | 1.2 | 112 | 160 | 99 | 24 | 92 | 1220 | 80 | 403 |
| | 7 | 50.0 | 48.8 | 1.2 | 219 | 262 | 96 | 26 | 60 | 578 | 74 | 387 |
| | 8 | 21.2 | 77.6 | 1.2 | 89 | 96 | 102 | 22 | 105 | 1486 | 78 | 411 |
| [a]p vs. $FI_{O2}$ | | | | | NS | NS | NS | 0.003 | 0.001 | 0.003 | NS | NS |

[a]Overall p values for the three animals combined.
Abbreviations: Area = area under the time-brightness curve, CV = cephalic vein, FA = femoral artery, FI = fractional inspired, IF = isoflurane, LV = left ventricular, Max = maximum, Min = minimum, $N_2$ = nitrogen, NS = not significant, $O_2$ = oxygen, RV = right ventricular.

In Dog 3, significant negative correlations were found between both the cephalic vein and femoral artery $P_{O_2}$ and the maximum LV brightness, p=<0.001.

While the slopes of the correlations between the $FI_{O_2}$ and the area under the RV time-brightness curve are negative in the three animals, r=−0.27, r=−0.55, and r=−0.47, respectively, the data variability was high so that RV brightness data from the three animals could not be combined for p-value computations.

A significant negative correlation (r=−0.91, p=0.002) was found between the $FI_{O_2}$ and the LV peak pressure. This again was seen only in Dog 3, with the variability in Dogs 1 and 2 precluding a combined p-value computation. No other significant relationship between the hemodynamic data and the LV or RV brightness indices was found.

In two of the animals, a single injection of 0.22 ml/kg was made while the animals were kept at an $FI_{O_2}$ of 40%. In Dog 3, this resulted in a minimum LV brightness of 26, a maximum of 99, and an area under the curve of 1540. In Dog 2, this resulted in a minimum brightness of 22, a maximum of 62, and an area under the curve of 373.

5.3.3 Discussion

Significantly, this Example shows the relationship between the opacification of the left ventricle and the inspired gas concentrations as the $FI_{O_2}$ was varied within the commonly used therapeutic range. While only three animals were studied, all three demonstrated changes in the same direction. The statistical method employed takes the small number of animals into account and shows the relationship to be highly significant.

It has been recognized for some time that the contrast effect in the LV cavity is less apparent at end systole than at end diastole. Wiencek et al. (1993) and most recently Vuille et al. (1994) have reported experimental data regarding the effect of pressure on the contrast effect of Albunex®. In the present Example, a significant negative correlation was found between the $FI_{O_2}$ and the LV and aortic pressures in Dog 3, that is, as $FI_{O_2}$ increased, left-sided pressures decreased. This relationship is the opposite to that predicted (Epstein and Plesset, 1959) or reported (Wiencek et al., 1993; Vuille et al., 1994) to decrease the contrast effect of Albunex®. Thus, the decrease in contrast effect seen during the present Example cannot be explained on the basis of a secondary change in left-sided pressures.

A significant relationship between the minimum brightness of the left ventricle and the $FI_{O_2}$ was found. This suggests that the attenuation in the right ventricle at higher $FI_{O_2}$s was less. This is further suggested by the inverse relationship between the $FI_{O_2}$ and the area under the RV time-brightness curve. While this relationship did not reach significance in these three animals, the combined LV and RV findings strongly support a loss of contrast effect between the injection site in the cephalic vein and the right ventricle. Such a loss would suggest that the mechanism for the decrease in left-sided contrast effect with increasing $FI_{O_2}$s is not necessarily a pulmonary loss, but in part due to a relationship between the Albunex® microbubbles and the partial pressure of dissolved gases in the venous blood. This is also suggested by a significant relationship between the cephalic vein $P_{O_2}$, and the maximal LV brightness and area under the LV time-brightness curve found in Dog 3.

It is, therefore, likely that the actual mechanism for the loss of contrast effect is related to the gradient existing between the gases in the microbubbles of Albunex® and the dissolved gas concentrations in the surrounding venous blood. Since Albunex® is manufactured by sonicating human plasma albumin under room air, the gas concentrations in the microbubbles are approximately 20% oxygen and 80% nitrogen. Thus, in the venous blood there is a gradient between the microbubble and carbon dioxide. This gradient is positive, but very small, and the carbon dioxide would tend to move into the bubble. Some of the bubbles may then be "sieved" out by the pulmonary capillaries, as suggested by de Jong et al., (1993) but this would not explain the significant decrease in left-sided attenuation during the RV contrast phase as seen in the present study.

The same rationale may be used in considering oxygen. Again, one would expect that if oxygen were the major factor, the increase in $FI_{O_2}$ would favor an increase in oxygen content in either the arterial or venous blood. Movement of oxygen across the membrane and into the microsphere would be favored on the arterial side, while on the venous side any potential outward gradient would be lessened.

Isoflurane is also a possibility. However, halothane and other anesthetic agents have been used in similar or higher concentrations in other Albunex® experimental preparations without recognized adverse effects on the contrast achieved. In addition, the concentration of isoflurane was held constant in each animal while the oxygen concentration was varied. This does not completely role out isoflurane as a factor, but it essentially eliminates isoflurane as a sole cause for the loss in contrast effect with increasing $FI_{O_2}$.

This leaves the nitrogen gradient as the most likely explanation for a loss of contrast effect. As the percentage of oxygen is increased in the inspired gas, the percentage of nitrogen decreases. Therefore, it seems that only nitrogen could account for a significant negative gradient which would tend to move nitrogen out of the bubbles, causing them to diminish in size and to lose their echogenicity. This would be in keeping with the predictions of Epstein and Plesset (1959) for bubbles in a gas-containing solution.

All of the studies were conducted by changing the $FI_{O_2}$ and holding the dose of Albunex® constant at the lowest recommended dose of 0.08 ml/kg. In two of the animals, however, a single injection of 0.22 ml/kg was made while the animals were kept at an $FI_{O_2}$ of 40%. In both of these injections, the brightness at the higher dose was slightly below that seen when using 0.08 ml/kg at 20% $FI_{O_2}$. Thus, it seems that the loss of contrast related to increasing $FI_{O_2}$ can be substantially overcome by increasing toward the maximal recommended dose of Albunex®.

5.3.4 Conclusion

The effect of increasing inspired oxygen concentrations on the LV contrast effects of Albunex® were systematically evaluated. A significant relationship between increasing inspired oxygen concentration and decreased LV opacification has been demonstrated. In animal studies, this occurs within the range of therapeutic supplemental oxygen concentrations. The loss of contrast could be restored on several injections by increasing the dose of Albunex® to the upper level of the recommended clinical range. While this study was performed in animals, the clinical implication is that patients on supplemental oxygen may require a higher dose of Albunex® for optimal LV opacification.

5.4 Example 4

Inhaled Gases Affect the Ultrasound Contrast Produces by Albunex® in Anesthetized Dogs 5.4.1 Methods 5.4.1.1 Animal Preparation This Example may be divided into two parts and describes the use of nine closed chest dogs (Marshal Farms, North Rose, N.Y.). The first part (Section 5.4.2) of this Example describes the use of five beagles ranging in weight from 10.9 to 14.8 kg. The second part (Section 5.4.3) describes the use of four mongrel dogs ranging in weight from 21.5 to 30.8 kg. The animals were handled according to the guidelines of the National Institutes of Health (Guide for the Care and Use of Laboratory animals, NIH #85-23). The Institutional Animal Care and Use Committee approved the study protocol.

Dogs were anesthetized with an intravenous injection of thiamylal sodium (20 mg/kg. Bio-Ceutic, St. Joseph, Mo.) and maintained by spontaneous inhalation of 1% to 3% isoflurane (AErrane, Ohmedia PPD, Inc., Liberty Comer, N.J.) using compressed air as the carrier gas. The left fermoral artery was cannulated to measure blood pressure.

The right femoral artery and vein were cannulated to collect blood samples for the measurement of blood gases.

An angiocatheter (18 gauge) was inserted into the cephalic vein for administration of the contrast agent. Needle electrodes were placed to obtain a lead II electrocardiogram. Blood pressure and electrocardiogram data were collected continuously by a computer data acquisitions system (Modular Instruments Inc., Malvern, Pa.). Raw wave forms were stored on optical disk (Panasonic Communications and Systems Company, Secaucus, N.J.). Blood gases were measured using a Coming 168 pH/Blood Gas Analyzer (Ciba Coming Diagnostics Corp., Medfield, Mass.). Arterial and venous samples were capped and placed on ice until analyzed. Measurements were performed within 15 minutes of collection.

5.4.1.2 Caridac Imaging

Two-dimensional ultrasound images of the heart were obtained using a Hewlett-Packard Sonos 500 ultrasound instrument (Hewlett-Packard, Andover, Mass.) with a 5 MHz phased array transducer. During ultrasound imaging, the dynamic range was adjusted to approximately 45 dB. The output power used during imaging was set at maximum (40 dB) throughout the entire protocol. Images were optimized using time gain compensation at the start of the protocol and not altered during the remainder of the study. Acquisition of the images began approximately 30 sec before administration of contrast material and continued for at least 30 sec after injection. The images were collected on video tape.

5.4.1.3 Contrast Material

Albunex® was supplied as a sterile, pyrogen-free suspension. The microsphere concentration of Albunex® was 3 to $5 \times 10^8$ spheres/mL with an average diameter of 3 to 5 $\mu$m and a maximum diameter of 25 $\mu$m, 95% of the spheres had a diameter of less than 10 $\mu$m. All injections of Albunex® were administered intravenously at a dose-volume of 0.22 mL/kg and a rate of approximately 1.0 mL/sec.

5.4.1.4 Image Analysis

Video images were analyzed independently by two observers blinded to the conditions of the injection. The duration of contrast was measured in both the right and left ventricles. In addition, the video tape images were copied to a second video tape, on which the sequence of images were scrambled for each animal. Two reviewers who were experienced at evaluating echocardiographic images graded the quality of the contrast produced by Albunex®. These reviewers again were blinded to the gas mixtures being inhaled for each injection. Assessment of contrast quality used the following scheme: 0=no contrast, 1=faint contrast, 2=intermediate contrast (partial filling of the ventricular chamber), 3=between intermediate and full chamber opacification, 4=full intense chamber opacification. The intensity of contrast in the left ventricular chamber also was analyzed by video densitometric techniques (Part I only). Individual images were collected from video tape using an ImageVue workstation (Nova Microsonics, Mahwah, N.J.). End-diastolic images were captured sequentially starting before the contrast agent entered the heart and continued for approximately 70 cardiac cycles. Single frame baseline and contrast images were digitized in a 512×480 pixel format using 256 levels of gray. The digitized images were stored on computer disk as TIFF files and imported into NIH Image v1.49 (National Institutes of Health, Washington, D.C.) for video densitometric analysis. Peak contrast generally occurred during the fifth cardiac cycle after the contrast agent entered the left ventricle. This single frame was used as the contrast image for analysis. If, however, attenuation was present during the fifth cardiac cycle, a second contrast image also was digitized. This second contrast image was selected subjectively on the basis of maximal brightness and was usually the first cardiac cycle after attenuation had stopped. For each analyzed image, a region of interest was scribed along the walls of the left ventricular chamber without including the endocardial border. A ml1ea pixel intensity (0=black and 255=white) was calculated for each region of interest. The changes in mean pixel intensity were determined by subtracting the contrast region of interest from the base-line region of interest.

5.4.1.5 Data Analysis

The mean and standard error for the durations, quality scores, and mean pixel intensities were calculated for each gas mixture inhaled. The mean and standard error for the partial pressures of oxygen and carbon dioxide were calculated for each gas mixture inhaled. Blood pressure and heart rate data were summarized as the mean±the standard error of the mean. Data were evaluated by analysis of variance coupled with a Student-Newman-Keuls procedure where appropriate. Linear regression analysis was performed on the durations of contrast with the partial pressures of oxygen in the arterial and venous blood. Statistical significance was set at $p<0.05$.

5.4.2 Effects of Inhaled Gas on Contrast Duraton and Intensity

For a baseline assessment, Albunex®b was injected three times while the dogs were inhaling compressed air. Each injection was separated by at least 3 min. Between injections of Albunex®, arterial and venous blood samples were collected for measurement of blood gases.

After the initial three injections of the contrast agent, the carrier gas for the isoflurane was changed to 100% oxygen. Albunex® was injected at least 15 min after changing the carrier gas. Injections were repeated for a total of three injections and were separated from one another by at least 3 min. Arterial and venous blood samples were collected before the first injection of Albunex® and between the second and third injections of Albunex®V for assessment of dissolved gas pressures. The carrier gas for isoflurane was modified further using different percentages of oxygen and nitrogen (20/80, 40/60, 50/50, 60/40, and 80/20, respectively), oxygen and nitrous oxide (20/80, 40/60, 60/40, and 80/20, respectively), and a return to compressed air. These percentages were achieved by adjusting the flow of each individual gas such that the maximum flow rate was 1.0 L/min with each gas making up a proportionate volume of each liter. Albunex® was injected at least 15 min after changing the carrier gas. For each gas mixture, injections of Albunex® were repeated for a total of three injections with a separation of at least 3 min between each injection. Arterial and venous blood samples were collected after 5 min of gas inhalation and between two injections of Albunex® for the measurement of dissolved gas pressures.

5.4.3 Time Course of Contrast After Introduction and Cessation of 100% Oxygen Inhalation During the inhalation of compressed air, Albunex® was injected intravenously 1 to 2 min before the inhalation of 100% oxygen. Albunex® was injected every, 30 sec after initiation of oxygen inhalation until no contrast agent appeared in the left ventricle. Arterial blood samples were obtained after each injection of Albunex®. Oxygen was inhaled for periods of 15, 30, and 60 min. The order of oxygen duration was randomized for each dog. A 30-min equilibration period was observed between each exposure to oxygen; during this period compressed air served as the carrier gas. Albunex® was administered 1 to 2 min before discontinuation of 100% oxygen. Albunex® was reinjected every 2 min after returning to the inhalation of compressed air. This process continued until a faint amount of the contrast agent appeared in the left ventricle, after which injections of Albunex® occurred at 1 min intervals. Albunex® was injected at 1 min intervals until the contrast agent completely filled the left ventricular chamber. Again, arterial blood samples were collected after each injection of Albunex®).

5.4.4 Results 5.4.4.1 Effects of Inhaled Gas on Contrast Duration and Intensity

During the inhalation of compressed air, intravenous injection of Albunex® caused opacification of both the left and right ventricular chambers of the heart. The contrast agent remained in the left ventricle for 17±1 sec and in the right ventricle for 14±1 sec. As the concentration of oxygen increased in the inhaled gas mixture. Albunex® produced contrast for shorter periods in the left ventricular chamber. At concentrations of 80% and 100% oxygen, Albunex® caused only brief periods of faint contrast and most injections of Aibunex® failed to create any contrast (10 of 13 injections and 12 of 14 injections, with respect to the percent oxygen). The duration of contrast in the left chamber correlated inversely with the partial pressure of oxygen in the arterial blood (r=0.824, p<0.001). In the right ventricle, Albunex® also produced shorter periods of contrast during inhalation of gases containing higher concentrations of oxygen. Unlike in the left ventricle, however, Albunex® created some contrast in the right ventricle even during the inhalation of 100% oxygen. The partial pressure of oxygen in the venous blood correlated inversely with the duration of contrast in the right ventricle (r=0.740, p<0.001). The inhalation of gas mixtures containing oxygen at concentrations greater than air also affected the quality of contrast produced by Albunex®. Video densitometric analysis also demonstrated a decrease in brightness with an increase in oxygen present in the inhaled gas mixture. The end-diastolic frame, which was measured five cardiac cycles after contrast entered the left ventricular chamber, demonstrated that Albunex® produced contrast significantly less intense at concentrations of 50% oxygen or greater compared with compressed air or 20% oxygen. At this fifth end-diastolic image, however, Albunex® attenuated the ultrasound image during the inhalation of compressed air or 20% oxygen. This Albunex® induced attenuation of the cardiac image artificially lowered the brightness of the ultrasound signal when compressed air or 20% oxygen was inhaled. Assessed immediately after the cessation of attenuation. Albunex® produced an increase in video densities of 48±7 units and 44±8 units during the inhalation of compressed air or 20% oxygen, respectively. Compared with the postattenuation values of brightness, Albunex® caused significant decreases in contrast intensity when gas mixtures of 40% oxygen or greater were inhaled.

In the presence of nitrous oxide, Albunex® caused no appreciable contrast in the left ventricle, regardless of the oxygen content in the inhaled gas. In the right ventricle, Albunex® produced contrast during the inhalation of the gas mixture containing nitrous oxide, but the duration of contrast was shorter than that produced during the inhalation of compressed air.

The inhalation of the various gas mixtures affected the concentrations of dissolved oxygen in both the arterial and venous blood (Table 6). As the percent of oxygen increased in the inhaled gas, the partial pressure of oxygen increased in both arterial and venous blood. The oxygen content of the inhaled gas caused no significant change in the partial pressure of carbon dioxide in the samples of arterial or venous blood. The partial pressure of oxygen increased to a greater extent during inhalation of the mixture of oxygen and nitrous oxide compared with the mixture of oxygen and nitrogen. Although this trend appeared throughout the range of oxygen concentrations, significant differences occurred at only 40% oxygen for arterial blood and 40%, 60%, and 80% for venous blood.

Baseline heart rates differed among the various inhaled gas mixtures when measured immediately before injection of Albunex® (Table 6). Inhalation of a mixture of oxygen and nitrous oxide gases caused no significant changes in heart rate compared with compressed air. Baseline arterial blood pressures also differed during the inhalation of the different gas mixtures (Table 6), although no consistent trends in arterial blood pressures occurred with the various gas mixtures. Intravenous administration of Albunex® caused no significant or consistent change in either heart rate or arterial blood pressure.

TABLE 6

BASELINE BLOOD GAS AND HEMODYNAMIC MEASUREMENTS FOR THE VARIOUS INHALED GASES

| Percent oxygen | Companion gas | Arterial partial pressure | | Venous partial pressure | | Heart rate (bpm) | Mean arterial pressure (mm Hg) |
|---|---|---|---|---|---|---|---|
| | | Oxygen (mm Hg) | Carbon dioxide (mm Hg) | Oxygen (mm Hg) | Carbon dioxide (mm Hg) | | |
| Compressed air | | 74 ± 7 | 45 ± 2 | 51 ± 2 | 48 ± 2 | 151 ± 5 | 95 ± 3 |
| 20 | Nitrogen | 65 ± 4 | 48 ± 3 | 55 ± 4 | 51 ± 4 | 147 ± 3 | 96 ± 2 |
| 20 | Nitrous oxide | 76 ± 5 | 49 ± 2 | 60 ± 3 | 55 ± 3 | 158 ± 3 | 97 ± 6 |
| 40 | Nitrogen | 183 ± 6* | 56 ± 3 | 68 ± 4* | 60 ± 4 | 143 ± 2 | 85 ± 1 |
| 40 | Nitrous oxide | 219 ± 17*† | 54 ± 3 | 80 ± 1*† | 60 ± 5 | 149 ± 3 | 88 ± 2 |
| 50 | Nitrogen | 236 ± 1* | 50 ± 1 | 71 ± 7* | 61 ± 4 | 142 ± 4* | 87 ± 2 |
| 60 | Nitrogen | 297 ± 5* | 52 ± 3 | 70 ± 3* | 56 ± 3 | 144 ± 3 | 89 ± 1 |
| 60 | Nitrous oxide | 314 ± 18* | 53 ± 4 | 92 ± 4*† | 60 ± 3 | 149 ± 2 | 82 ± 2*† |
| 80 | Nitrogen | 388 ± 17* | 50 ± 3 | 69 ± 5* | 58 ± 3 | 139 ± 2* | 88 ± 2 |
| 80 | Nitrous oxide | 399 ± 11* | 57 ± 3 | 98 ± 5*† | 65 ± 5 | 145 ± 3 | 84 ± 2 |
| 100 | — | 474 ± 9* | 54 ± 5 | 75 ± 6* | 60 ± 5 | 135 ± 3* | 82 ± 3* |

*Significantly different ($p < 0.05$) from compressed air by ANOVA coupled with Student-Newman Keuls procedure.
†Significantly different ($p < 0.05$) from nitrogen by ANOVA coupled with Student-Newman-Keuls procedure.

5.4.4.2 Time Course of Contrast After Introduction and Cessation of 100% Oxygen Inhalation Switching from a carrier gas of compressed air to 100% oxygen caused Albunex® to lose the ability to create contrast in the left ventricle in a period of approximately 3 min. The effect of oxygen on the contrast caused by Albunex® required a longer period to disappear after restoration of air inhalation. A consistent appearance of the contrast agent in the left ventricle required the inhalation of compressed air for approximately 10 min. The duration of contrast produced by Albunex® increased (towards baseline values) as the animals continued to breathe compressed air.

5.4.5 Discussion

The duration and quality of ultrasound contrast produced by Albunex® decreased as the concentration of oxygen increased in the inhaled gas. During inhalation of a mixture of oxygen and nitrous oxide gases, however, Albunex® created no ultrasound contrast in the let ventricle, regardless of the oxygen content. The difference between these two sets of carrier gases lies in the companion gases to oxygen, nitrogen, or nitrous oxide. As the oxygen content increased, the amount of nitrogen commensurably decreased in the mixtures of oxygen and nitrogen gases. The duration of contrast produced by Albunex® decreased as the nitrogen concentrations fell. The gas mixture of oxygen and nitrous oxide contained no nitrogen, conditions under which Albunex® caused no contrast in the left ventricle. These data suggest that decreased amounts of nitrogen in the carrier gas cause Albunex® to lose the ability to create contrast.

The contrast-producing component of Albunex® is air, which is a mixture of gases (Christiansen et al., 1994), primarily oxygen (approximately 20%) and nitrogen (approximately 80%). Any loss of gas from the microspheres would diminish the amount of ultrasound contrast produced by Albunex®. Placed in an unsaturated solution, gas bubbles shrink by diffusion, which is strongly dependent on the solubility and molecular weight of the gases (Epstein and Plesset, 1950; Van Liew and Burkard, 1995). The loss of Albunex® induced contrast may result from a similar diffusion of gas out of the microspheres and into the blood.

As the gas mixture deviated further from air, the efficacy of Albunex® progressively decreased. The loss of contrast by Albunex® began to occur within a therapeutic range of oxygen concentrations (Luce and Hopewell, 1992). These data suggest that patients subjected to supplemental oxygen may experience less contrast (quality and duration) in the left ventricle after intravenous administration of Albunex®. Changes in dose-volume or injection rate may help improve the quality, of contrast produced by Albunex® when the subject inhales oxygen at concentrations used under clinical conditions (Wible Jr. et al., 1996).

The effects of inhaled gases on Albunex® contrast occurred in a fairly short period of time. To reverse this effect, however, compressed air needed to be inhaled for at least 10 to 15 mn before Albunex® again consistently produced contrast in the left ventricle. Thus in situations where the removal of supplemental oxygen for short periods is possible, Albunex® can regain the ability, to fill the left ventricular chamber with ultrasound contrast.

5.5 Example 5

Importance of Acoustic Power and Exposure Time for Optimal Contrast In Vivo The example describes the importance of the acoustic power and exposure time for optimal contrast in vivo, as well as the effectiveness of second harmonic imaging with Albunex®.

5.5.1 Methods

Eighteen normal subjects were randomly assigned to two groups, one of 12 subjects and one of six subjects. In the first group, the time-brightness curves of the LV cavity, RV cavity, and three perfusion beds were compared with the output power and transient response imaging as the variables. In the second group, the time-brightness curves of the LV cavity, RV cavity, and three different perfusion beds were compared with fundamental or second harmonic image formations as the variables.

5.5.1.1 Subject Selection

Adults of both genders, and of several races, in the 18 to 50 year age group, with good to excellent quality parasternal short-axis images were included. Subjects who were pregnant, had a history of smoking, or had a history of hypersensitivity to blood products were excluded.

Subjects were recruited by word of mouth from the population of the University of Florida (Gainesville, Fla.). All protocols were approved for human experimentation by the Institutional Review Board for the University of Florida.

5.5.1.2 Image Acquisition

All images were obtained using an ATL HDI 3000 (Bothell, Wash.). The study subjects were randomly divided into two groups, one of twelve subjects and one of six subjects. One sonographer acquired all the images in the study. Parasternal short-axis views at the mid-papillary level with cavity area minimized (Schiller, 1989) were obtained on all subjects. An I.V., with a 3-way stopcock attached, was started in the right anticubitus vein with D5W or normal saline running at a TKO rate. The subject was placed in the left lateral decubitus position. The position and head elevation was noted. A 0.01 mL/kg injection of Albunex® was given at a rate of one mL/sec for each study condition. The stopcock was turned to "wide open" and the subject's arm was raised immediately following the injection. One injection of Albunex® was given to optimize ultrasound system settings for visualization of contrast prior to acquisition of experimental data. Transducer frequency, gain, time-gain compensation, depth, focal depth, frame rate, dynamic range, and gray scale were recorded and subsequently held constant after the initial image optimization at the first injection of Albunex® for each subject.

In the first twelve subjects, output power and insonification time were the variables. The images were recorded on video tape and were digitized on a Nova MicroSonics ImageVue system (Allentown, N.J.) prior to analysis. The images were transferred via ethernet from the Nova MicroSonics ImageVue system of the clinical echocardiography laboratory to the IBM RISC system 6000 (White Plains, N.Y.) of the Echocardiography Research Laboratory for image analysis.

In the second six subjects, image formation, findamental versus second harmonic, and output power were the variables. Once optimal transducer position had been obtained, transient response imaging at ED was activated. The injecting physician counted 7 ED frames and then injected. When the sonographer subsequently reached a count of 99 the frame buffer freeze was activated. Since 3 cycles usually pass after injection and before appearance of contrast in the right ventricle, this procedure invariably resulted in 10 ED frames being available as control frames prior to arrival of contrast. The entire sequence of 99 transient response images were transferred directly from the ultrasound system to a Silicon Graphics (SGI) Indy system (Mountain View, Calif.) in digital polar format. These polar image files were then transferred via ethernet, from the SGI to the IBM RISC system 6000 for analysis.

5.5.1.3 Image Analysis

A total of 105 injections of Albunex® were given to the first twelve subjects. In each, output power and insonification time were varied. The insonification times were: 1) continuous, 2) triggered on the peak of the R-wave for one frame per cardiac cycle(ED), or 3) triggered on the peak of the R-wave and at the end of the T-wave for two frames per cardiac cycle(ED and ES). The output power was 100%, 66%, or 33%. Epicardial and endocardial borders were defined using methods developed in the Echocardiography Research Laboratory at the University of Florida, (Wilson, 1996; Kaul, 1996). Background brightness was calculated using the 10 control end-diastolic frames from each subject. For the left ventricle, the average pixel brightness was calculated for the anterior 50% of the LV cavity of each frame. The background brightness in this region was subtracted from the total brightness with contrast on each subsequent frame so that background adjusted, time vs. brightness curves were constructed (Halmann, 1994). The time axis was then corrected to true time (in seconds) by adjusting for heart rate. The peak left ventricular intensity above control, and the area under the curve was calculated for each exposure time variable and compared.

Images were obtained from the second set of six subjects in the same manner as above with the variable being method of image formation. One hundred serial end-diastolic frames (control and experimental) were collected using 100% power output, and triggered on the peak of the R-wave of the ECG. Image formation was either fundamental or second harmonic. The LV cavity opacification was analyzed in the same manner as in the first 12 subjects. Since the border detection method defines both the epicardial and endocardial borders, myocardial brightness was also analyzed in three regions:

1) the left anterior descending (LAD) region defined as the mid 50% of the anterior ⅔ of the ventricular septum.
2) the right coronary artery (RCA) region defined as the mid 50% of the posterior ⅓ of the ventricular septum plus the inferior wall.
3) the left circumflex (LCx) region defined as the mid 50% of the posterior and posterolateral walls.

The mean of the three regions was also calculated. The lateral wall was not included due to lung and/or rib shadowing.

5.5.1.4 Statistical Methods

From the time vs. brightness curves, the background subtracted peak intensity, and the area under the curve for the myocardial regions were compared across fundamental and second harmonic image formation.

At 100% output power of the ultrasound system, the background-subtracted area under the curve for the anterior LV cavity increased with transient imaging compared to continuous imaging in seven of the twelve subjects. Across all 12 subjects, the mean, background-corrected, cavity brightness the area under the curve increased from 366 to 500 units. The SD's, however, were large so that this increase was not statistically significant.

In the myocardium, the background-corrected area under the curve increased with transient imaging as compared to continuous imaging, in nine of the twelve subjects. The mean brightness over the combined myocardial regions increased from 124 to 186 units. Again the SD's were large so that this increase was not statistically significant. With the output power lowered to 66% and 33%, the results were similar. However, with these lower power outputs, in spite of the measured increase in brightness, the image quality decreased so markedly that the data had little to no clinical value.

In the second group of subjects, comparing fundamental to second harmonic image formation using 100% output power and transient response imaging, the background-corrected area under the curve for the combined myocardial region increased in intensity from 206 to 532 units ($p \leq 0.03$), and the peak increased from 10 to 31 units with second harmonic imaging. The LAD, RCA, and LCx were also analyzed separately. The peak intensity of the LAD increased from 22 to 46 units ($p \leq 0.0004$). The RCA increased from 10 to 43 units ($p \leq 0.0001$). The LCx decreased from 25 to 23 units (p=NS). The area under the curve for the LAD, and the RCA increased from 396 to 846 units and 176 to 756 units, respectively. The LCx decreased from 423 to 346 units.

5.5.2 Results

In the first group of eighteen subjects, the background-subtracted area under the curve increased with both transient response imaging and with lower output power. However, the standard deviations were so large that the increases were not statistically significant.

In the second group of six subjects, the background-subtracted area under the curve and the peak intensity increased, with second harmonic imaging, for the combined myocardial regions, the LAD, and the RCA regions. The increases were statistically significant. The LCx region was determined to be unreliable due to lung or rib shadowing.

5.5.3 Discussion

5.5.3.1 Opacification of the Left Ventricle

In these two groups of subjects, there appears to be more opacification of the LV when using transient response imaging as compared to continuous imaging. This increase, however, was not statistically significant nor does it appear to be of clinical use. The data acquired at the lower power output settings showed a similar relationship, but low power images were of poorer quality so that these data are not likely to be of clinical importance.

When transient response imaging is combined with second harmonic image formation, however, the increase in brightness of the LV cavity reaches statistical significance compared to transient response imaging with fundamental mode. By using transient response imaging, the in vitro destruction of the Albunex® is probably reduced. More importantly, however, in the normal LV, with rapidly moving blood, the flow of new microspheres into the LV is rapid enough that increased longevity is of little importance. The greater opacification of the LV is more dependent on image optimization and on the use of second harmonic imaging.

5.5.3.2 Opacification of the Myocardium

The peak intensities from the time-brightness curves of the coronary perfusion beds occurred slightly later than the peak intensities of the ventricles. This would imply that the contrast in the myocardium was due to bubbles in the myocardium and not due to the "blooming effect" of the contrast within the ventricles or from bubbles trapped in the ventricular trabeculae. This difference appears in the time-brightness curves of the fundamental as well as the second harmonic images. Myocardial perfusion is not visible to the human eye in the fundamental images, and could only be determined by computer analysis. Myocardial perfusion is visible to the human eye in the second harmonic images, but the timing can only be determined by computer analysis.

5.6 Example 6

Long-Axis Automated Border Detection

The inventors have developed a method of tracking the myocardial contrast regions in an apical long axis view echocardiogram. Within a single image, a large mean filter is passed through the image from left to right, although direction of passage is not critical. The output of the filter is a two dimensional graph of mean brightness across the image providing a first approximation of the position of the septum, which runs approximately vertically in most apical long axis views.

With knowledge of the approximate position of the septum (solid line in the cumulative mean brightness curve, multiple Laplacian filters are moved across the image through a region of interest around the approximated position of the septum. The location of the maximum for each Laplacian filter is determined and a best fit line is made through the upper two thirds of the image. In general, the septum is fairly straight or only slightly curved, especially in the $\frac{2}{3}$ of the septum that are closest to the mitral valve ring. Thus the straight line filter is the simplest initial shape to look for in the image.

The mitral valve ring or aortic valve ring intersects the best fit line at a right angle. Thus, the next step is to forma large L-shaped filter and move it from approximately the midpoint of the septal slope line down the image until a maximum occurs. This maximum is the most likely position of the valve ring, representing the plane of separation between the atria and ventricles. This position is the medial ED Mv position and is referred to as the registration point.

This registration point is used as a guide to locate manually (implemented) or automatically segmented regions of the myocardium. This is particularly useful when comparing several frames in a sequence of triggered images, also known as transient response images. Without the use of a registration point, movement of the heart due to breathing would cause inaccurate results because the regions may no longer be aligned with the border of the myocardium.

The mean brightness in each of the translated regions is found to produce the time versus brightness curves.

5.7 Example 7

Summary of Long-Axis Algorithm Description

The present example describes the development of an algorithm by the inventors to facilitate the automated analysis of the echocardiographic imaging described herein. An exemplary summary of steps in the analysis has been given in both abbreviated and detailed format to permit a complete understanding of the exemplary method.

5.7.1 Brief Descritption of the Long-Axis Algorithm

The inventors have optimized this algorithm for use in the methods of analyzing a short-axis view of the heart. To that end, the inventors have determined that the sequence in which the filters are applied and the specific filters applied in that sequence produced the best correlation with observer determined borders over hundreds of images. If a substitution is made or change made in the shape or numerical values within a filter, this agreement deteriorates. Thus, in the case of the short axis images, the inventors ceontemplate that the highest fidelity imaging is obtained when all of the filters and all steps of the process are performed, however, less robust analyses may be performed omitting one or more of the disclosed steps.

In general the method begins by identifying an approximation to the y coordinate of the center $(x\_0, y\_0)$ of the LV as 30% of the distance between the first and last row of the sector scan. For this choice of $y\_0$ and each column between 40% and 67% of the distance between the left and right limits of the sector scan compute a mean filter which sums vertically down columns. This sum begins at the row $y=y\_0$ and ends at the row an additional 10% of the distance to the Ist row of the scan. For each image frame number between ED and ES find the column with the minimum sum. Sort these columns and choose the line $x=x\_0$ through the middle of the LV cavity to be the column which represents the median of these column values.

Set the limits for the search region for the septal wall as all points (x,y) where x is between 25 and 75% of the left and right limits of the sector scan and y is between 14 and 60% of the first and last row of the sector scan. However, no computations are made to the right of the column $x=x\_0$.

For each frame estimate the position of the septal wall by using a threshold and 2nd derivative operator on the sums along columns computed above. The threshold is set equal to $^{11}/_{10}$th's of the mean of all the column sums. For all those columns with sums above this threshold, compute the 2nd derivative operator indicated by the template $|-3/8| .. |<8/8>| .. |-2/8| .. |-2/8|$, where the dots to the left of the center pixel <8/8> represent about 12–16 pixels and the dots to the far right represent 30–40 pixels. These distances are chosen large enough to reach across the expected wall thickness of the septum.

For the image frames between ED and ES find the median of the column locations estimating the septal wall. This column will represent the approximate location for all the septal walls for all time steps.

Create a lookup table based on the second derivative operators:

|−1|−1|−1|
| . | . | . |
| . | . | . |
| . | . | . |
|2|<3>|2|
| . | . | . |
| . | . | . |
| . | . | . |
| |−4| |

This new lookup table contains only the values 0 or 1, where 0 represents blood and 1 represents structure. If the pixel location is below a set threshold (40 if ED or ES and 50 otherwise), then the value of this array is set 0. In addition, the operator is computed for the frames before and after the current frame. If both the pixel intensity and the value of this operator is above a set thresholds, then the value in the lookup table is set equal to 1.

The slope of the septum is estimated by using the 0-1 2nd derivative lookup table described above by calculating which line passes through the most values considered structure.

The border points along the septum wall and the right lateral wall are now estimated using the 2nd derivative operator:

$|-3/8| .. |<8/8>| .. |-2/8| .. |-2/8|$, where the dots to the left of the center pixel <8/8> represent about 12–16 pixels and the dots to the far right represent 30–40 pixels. This filter was designed under the assumption that the intensities on both sides of the septum are low, while the intensity on the free wall of the RV could be big. The coefficients of this filter are chosen to avoid putting the border estimates on the free wall of the RV.

The mitral valve ring near the septal (ie the left headlight) is estimated by finding the row y=y_1 where the maximum output value of the following filter occurs.

```
        | - ¾-¾ ... -¾-¾ |-
        --| -¾-¾ ... -¾-¾ | | reach/4
        reach/4 | |-¾-¾ ... -¾-¾ |-
        | | 1 1 ... 1 1 |-
        --| <1> 1 ... 1 1 | |reach/4
        | 1 1 ... 1 1 |-
        ---------- reach ----------
```

This filter is only computed near the septal wall. The values of reach are in the range of 12–16 pixels.

The mitral valve ring near the free wall of the LV (i.e. the right headlight) is estimated by finding the row y=y_2, where the maximum output value of the following filter is computed.

```
        | -¾-¾ ... -¾-¾ |-
        --| -¾-¾ ... -¾-¾| |reach/4
        reach/4 | | -¾-¾ ... -¾-¾ |-
        | | 1 1 ... 1 1 |-
        --| 1 1 ... 1 <1> | |reach/4
        | 1 1 ... 1 1 |-
        ---------- reach ----------
```

Again, the values of reach are in the range of 12–16 pixels.

Set the upper limit of the row number of the apex search region as the first row of the sector scan +5% of the difference between the last row and the first row. If the intersection of the center line through the middle of the LV and the left line of the sector scan is lower than this upper limit, then the row number of the intersection is used as an adjusted upper limit. Note that this adjustment only takes place when the slope of the center line is negative.

Compute the row number of the apex near the center line of the LV by a combination of two thresholds; one for the pixel intensities and one for the 1 st derivative operator defined by the template

|<1>|
| . |
| . |
| . |
|-3/4|.

The threshold for the pixel intensities is set equal to the mean +2*sd/3, while threshold for the 1 st derivative=the mean+sd/2. The apex row number is defined as y=y_3, which has the property that both filter computations are higher than their respective thresholds.

For each row between the apex and the mitral valve plane compute the border points near the septum and the LV free wall as the column locations, where output value of the 2nd derivative filter

|-3| .. |1| .. |-2| . |-1|/8 is maximized.

5.7.2 Detailed description of Long-Axis Algorithm

The following represents a more detailed description of the algorithm preferred in the practice of the disclosed methods.

Step 1. The sector scan delimiting the echocardiographic image is determined. In particular, all device information, EKG plots, and patient data information is excluded.

```
                    . --------first row
                   . .
                  .   .
                 .     .
                .       .
               .         .
    left_limit☐ .         . right_limit☐
             .             .
            .               .
           .                 .
          .                   .
         .                     .
        .                       . (right_vertex_x, right_vertex_y)
       .                       .
      .                       .
       . . .           ----- last row
       low_limit☐
```

Step 2. A mean filter is computed for each image frame and selected pixels in the sector scan. In the current implementation (Jun. 22, 1998) this filter is computed for every 4th (for wif images) or 5th row (for DCR images) between 10% and 90% of the distance between first row and last row indicated in the above diagram. When the filter is computed near the boundary of the sector scan, pixel values outside the sector scan are excluded. The values are stored in a convenient lookup table so that its values can be used in different combinations in succeeding steps described below. The array used to store the values will contain 64

```
                    . --------first row
                   . .
                  .   .
                 .     . ------10%
                .       .
               .         .
    left_limit☐ .         .
             .             .
            .               .
           .                 .
          .                   .
         .                     .
        .                       . (right_vertex_x, right_vertex_y)
       .                       .
      .                       . ------90%
       . . .           ----- last row
```

Step 3. Identify an approximation to the row coordinate of the center of the LV as 30% of the distance between the first row and the last row of the sector scan.

```
                    . --------first row
                     . .
                     . .
                  .     .       ------10%
                .        .
              .            .
left_limit ▯ .               .   ------30% Approx Row Center of LV
            .                 .
             .                 .
              .                 .
               .                 .
                .                 .
                 .       (right_vertex_x, right_vertex_y)
                  .     .
                   .   .
                    . .   ------90%
                   . . .  ----- last row
```

Step 4. For the row center identified in Step 3 and each column between 25% and 86% of the distance between the left and right limits of the sector scan (at the row coordinate of the center) compute (using the mean filter lookup table discussed in Step 2) that sums vertically down columns. This sum begins at the row center identified in step 3 and ends at the row an additional 10% of the distance (lastrow-firstrow). At typical column where these sums are computed is indicated by *'s below.

```
                    . --------first row
                     . .
                     . .
                  .     .       ------10%
                .        .
              .     *      .
left_limit ▯ .        *      .   ------30% Approx Row Center of LV
            .          *      .
             .          *      .
              .          *      .
               .                 .
                .                 .
                 .       (right_vertex_x, right_vertex_y)
                  .     .
                   .   .
                    . .   ------90%
                   . . .  ----- last row
                   |    |
                   |    |
                   |    |
                   |    |
                  25%  86%
```

Step 5. For each frame number between ED and ES find the column with the minimum sum computed in Step 4. This minimum is searched over the more restricted region between 40 and 67% indicated below.

```
                    . --------first row
                     . .
                     . .
                  .     .       ------10%
                .        .
              .     *      .
left_limit ▯ .        *      .   ------30% Approx Row Center of LV
            .          *      .
             .          *      .
              .                 .
               .                 .
                .                 .
                 .       (right_vertex_x, right_vertex_y)
                  .     .
                   .   .
                    . .   ------90%
                   . . .  ----- last row
                   |    |
                   |    |
                   |    |
                   |    |
                  40%  67%
```

Step 6. Sort the columns found in Step 5. Choose the center line through the middle of the LV cavity to be the column which represents the median of these values.

Step 7. Set the limits for the search region for the septal wall as all points (x,y) where x is between 25 and 75% of the left and right limits and y is between 14 and 60% of the first and last row of the sector scan. However, no computations are made to the right of the column found in Step 6.

```
                    . --------first row
                     . .
                     . .
                  .     .       ------14%
                .        .
              .            .
left_limit ▯ .     *         .   ------30% Approx Row Center of LV
            .        *        .
             .        *        .
              .        *        .
               .                 .
                .                 .
                 .                 .
                  .     .        ------60%
                   .   .
                    . .   ------90%
                   . . .  ----- last row
                   |    |
                   |    |
                   |    |
                   |    |
                  25%  75%
```

Step 8. Detect the septal wall estimates for each frame using a threshold and 2nd derivative operator on the column values computed in Step 4. The threshold is ¹¹/₁₀ths of the mean of all the column values. For all those columns above this threshold, compute the 2nd derivative operator indicated by the template

```
| -⅜| .. | < ⅝ > | .. | -⅜ | .. | -⅜ |,
| --12-16- | -- 30-40 --- |
``` where the dots of the left of the center pixel <8/8> represent about 12–16 pixels and the dots to the far right represent 30–40 pixels. These distances are chosen large enough to reach across the expected wall thickness of the septum.

Step 9. Sort the column locations found in Step 8 and find the median. This column will represent the approximate location for all the septal walls for all time steps. (One assumes that the septum does not move dramatically during the cardiac cycle.

Step 10. Use the lookup table computed in Step 2 to create a new lookup table based on second derivative operators. This new lookup table contains only the values 0 or 1, where i(hopefully) 0 represents blood and 1 represents structure. If the pixel location is below a set threshold (40 if ED or ES and 50 otherwise), then the value of this array is set=0. The template (with various reaches depending on whether or not the frames are near ED or ES) looks something like:

| |2|-1|
|-1|3|-4|
| |2|-1|

In addition, the operator is computed for the frames before and after the current frame. If both the pixel intensity and the value of this operator is above set thresholds, then the value in the lookup table is set equal to 1.

Step 11. The slope of the septum is estimated by using the 0-1 lookup array formed in Step 10 to determine which line passes near the most values considered structure.

Step 12. The border points along tne septum and the right lateral wall are now estimated. The column of the center is first estimated again using the operator:

|-3/8| .. |<8/8>| .. |-2/8| .. |-2/8|, where the dots to the left of the center pixel <8/8> represent about 12–16 pixels and the dots to the far right represent 30–40 pixels. This filter was designed under the assumption that the intensities on both sides of the septum are small while the intensity on the left side of the RV could be big. This filter is intended to avoid putting the border estimates on the outer wall of the RV.

Step 13. The mitral valve ring near the septal (i.e. the left headlight) is estimated by finding the row number where the maximum value of the following filter is computed.

```
| -¾-¾ ... -¾-¾ |-
--| -¾-¾ ... -¾-¾ | | reach/4
reach/4 | | -¾-¾ ... -¾-¾ |-
| | 1 1 ... 1 1 |-
--| <1> 1 ... 1 1 | | reach/4
| 1 1 ... 1 1 |-
---------- reach ----------
```

Step 14. The mitral valve ring near the free wall (i.e. the right headlight) is estimated by finding the row number where the maximum value of the following filter is computed.

```
|- ¾-¾ ... -¾-¾ |-
--| -¾-¾ ... -¾-¾ | | reach/4
reach/4 | | -¾-¾ ... -¾-¾ |-
| | 1 1 ... 1 1 |-
--| 1 1 ... 1 <1> | | reach/4
| 1 1 ... 1 1 |-
---------- reach ----------
``` along the estimated septum from latRow[startrowLat] to latRow[endrowLat] where the array latRow[ ] was calculated.

Step 15. Compute the upper limit of the row number of the apex search region. It computes the intersection of the center line and the left scan line. If the intersection is lower than the initial startrow which is the first row of the scan line +5% of the last row and the first row difference, then the row number of the intersection is used as an adjusted startrow. Note that this adjustment only takes place when the slope of the center line is negative.

Step 16. Compute the row number of the apex. Near the center line compute the mean intensity of the image in a small rectangle and save the result in array. Apply the filter [<1> –3/4] to the array to get a new 1st derivative array. Set a threshold as for the first array as the mean +2*sd/3 and of the 1st derivative array as the mean +sd/2. The apex row number is defined as the first intensity peak which has the property that both filter computations are higher than their respective thresholds.

Step 17. Trace the septum and LV lateral to get other border points along the septum. The maximum value of the filter |–3| .. |1| .. |–2| .. |–1|/8 is used.

Step 18. Compute the column number of the most significant structure in the right side of the estimated LV center line by computing the maximum value of the filter:
|–3| .. |1| .. |–2| .. |–1|/8

5.8 Example 8

Comparison of Observer Defined Points of Those of an Automated Analysis Algorithm for Exhocardiographic Apical Four Chamber Images Using the algorithm for definition of the left ventricle endocardium from apical views described in Example 7, the inventors have demonstrated the successful automated quantitative imaging of long-axis views of a human heart. This Example illustrates the ability of this long-axis automated border detection (ABD) algorithm to define the mitral valve (MV) annulus, systolic MV annulus movement, and long axis shortening in apical four chamber (A4C) images.

The methods of the present invention may be practiced using commercially-available computers and equipment for displaying and manipulating echocardiographic images. Images were obtained using standard commercial equipment including an ATL (Advanced Techology Laboratories) HDI 3000 ultrasound system or Hewlett Packard Sonos 1500 system. Images were obtained in either direct digital polar scan line format from the ATL equipment or on videotape from the Hewlett Packard 1500 system. If obtained on video tape, the images were converted to digital format in a Nova Microsonics review station and transferred to the principle development computers which were IBM Risk system 6000 computers.

5.8.1 Methods

The following example compares the results obtained by an automated analysis algorithm with the results obtained by an expert observer in defining selected points for echocardiographic apical four chamber images. The algorithm was developed for definition of the left ventricle endocardium from apical views.

In this example, 16-frame, apical four chamber (A4C) systolic sequences were digitized (512×480 pixels) from 61 patient studies (two from each study) for a total of 122 sequences. Studies were retrospectively selected based on good image quality but included a variety of anatomic positions and shapes and left ventricular sizes. An independent expert observer defined three points at end-diastole (ED) and end-systole (ES). The three points were 1) the medial MV annulus, 2) the lateral MV annulus, and 3) the epicardial apex. The long-axis automatic border detection (ABD) algorithm also independently located these three positions. The center point of the MV plane was calculated from the medial MV annulus and the lateral MV annulus. Movement of the MV plane and long-axis (LA) shortening were calculated from the center point of the MV plane and apex point between ED and ES. The correlations (r) mean differences (mean diff) and standard deviations (SD) of the differences between the expert observer and ABD determined positions and indices were calculated. The results are shown in Table 7.

TABLE 7

|  | Medial ED MV position | Medial MV movement | MV plane movement | LA shortening |
|---|---|---|---|---|
| r | 0.97 | 0.90 | 0.83 | 0.77 |
| mean diff (mm) | 0.5 | 0.1 | 1.1 | 0.2 |
| SD (mm) | 3.0 | 1.9 | 2.4 | 3.4 |

Thus, the long-axis ABD locates the medial MV annulus and tracks its motion with accuracy similar to that of an expert observer. MV annulus movement and LA shortening defined by the algorithm correlate well with those defined by an observer.

The above results reveal that the long-axis ABD locates the medial MV annulus and tracks its motion with accuracy similar to that of an expert observer. MV annulus movement and LA shortening defined by ABD also correlate well with those defined by the observer.

6.0 REFERENCES

The references listed below are incorporated herein by reference to the extent they supplement, explain, provide a background for or teach methodology, techniques and/or compositions employed herein:

U.S. Pat. No. 5,257,624, issued Nov. 2, 1993.

U.S. Pat. No. 5,360,006, issued Nov. 1, 1994.

U.S. Pat. No. 5,797,396, issued Aug. 25, 1998.

Adam, Hareuveni, Sideman, "Semiautomated border tracking of cine echocardiographic ventricular images," *IEEE Trans. Med. Imag*, MI-6(3):266–271, 1987.

Baldock, "Trainable models for the interpretation of echocardiographic images," In: *Information Processing in Medical Imaging*, Lecture Notes in Computer Science, Vol. 511, A. C. F. Colchester and D. J. Hawkes (Eds.), 12th International Conference, Springer-Verlag, pp. 408–418, 1991.

Beghdadi and Negrate, "Contrast enhancement based on local detection of edges," *Comput. Vision, Graphics, Image Processing*, 46:162–174, 1989.

Bookstein, "Quadratic Variation of Deformations," In: *Information Processing in Medical Imaging*," J. Duncan and G. Gindi (Eds.), In: *Lecture Notes in Computer Science, Vol.* 1230, 15th International Conference, Springer-Verlag, pp. 15–28, 1997.

Bosch, J. G., Savalle, L. H., van Burken, G., Reiber, J. H. C., "Evaluation of a semiautomatic contour detection approach in sequences of short-axis two-dimensional echocardiographic images," *J. Am. Soc. Echocardiogr.*, 8:810–21, 1995.

Bosch, Reiber, van Burken, Gerbrands, Gussenhoven, Bom, Roelandt, "Automated endocardial contour detection in short-axis 2-D echocardiograms: methodology and assessment of variability," In: *Proc. 15th Conf Comput. in Cardiol.*, 137–140, 1988.

Chalana, V., Linker, D. T., Haynor, D. R., Kim, Y., "A multiple active contour model for cardiac boundary detection on echocardiographic sequences," *IEEE Trans. Med Imag.*, 15:290–98, 1996.

Christiansen, Kryvi, Sontum, Skotland, "Physical and biochemical characterization of Albunex™, a new ultrasound contrast agent consisting of air-filled albumin microspheres suspended in a solution of human albumin," *Biotechnol. Appl. Biochem.*, 19:307–20, 1994.

Chu, Delp, Buda, "Detecting left ventricular endocardial and epicardial boundaries by digital two-dimensional echocardiography," *IEEE Trans. Med. Imag.*, 7(2):81–90, 1988.

Conetta, D. A., Geiser, E. A., Oliver, L. H. et al., "Reproducibility of Left Ventricular Area and Volume Measurements Using a Computer Endocardial Edge Detection Algorithm in Normal Subjects," *American Journal Cardiology*, 56:947–952, 1985.

Cootes, Hill, Taylor, Haslam, "The use of active shape models for locating structures in medical images," In: *Information Processing in Medical Imaging*, H. H. Barrett and A. F. Gmitro (Eds.), Lecture Notes in Computer Science, Vol. 687, 13th International Conference, Springer-Verlag, pp. 33–47, 1993.

de Jong, T. Cate, Vletter, Roelandt, "Quantification of transpulmonary echocontrast effects," *Ultrasound Med. Biol.*, 19(4):279–288, 1993.

Detmer, P. R., Gashein, G., Martin, R. W., "Matched filter identification of left-ventricular endocardial borders in transesophageal echocardiograms," *IEEE Trans. Med Imag*, 9:396–404, 1990.

Dias, J. M. B., Leitao, J. M. N., "Wall position and thickness estimation from sequences of echocardiographic images," *IEEE Trans. Med. Imag.*, 15:25–38, 1996.

Duncan, Owen, Staib, Anandan, "Measurement of non-rigid motion using contour shape descriptors," In: *Proc. Comput. Vision and Pattern Recog. (CVPR) Conf*, 318–324, 1991.

Epstein and Plesset, "On the stability of gas bubbles in liquid-gas solutions," *J Chem. Phys.*, 18:1505–1509, 1959.

Epstein and Plesset, "On the stability of gas bubbles in liquid-gas solutions," *J Chem. Phys.*, 18:1505–09, 1950.

Feng, J., Lin, W. C., Chen, C. T., "Epicardial boundary detection using fuzzy reasoning, *IEEE Trans. Med. Imag.*, 10:187–199, 1991.

Friedland and Adam, "Automatic ventricular cavity boundary detection from sequential ultrasound images using simulated annealing," *IEEE Trans. Med. Imag.*, 8(4):344–353, 1989.

Geiser and Bove, "Calculation of left ventricular mass and relative wall thickness," *Archives of Pathology*, 97:13–21, 1974.

Geiser, E. A., Oliver L. H., Gardin, J. M. et al., "Validation of an edge detection algorithm for two-dimensional echocardiographic shortaxis images," *J. Am. Soc. Echocardiogr.,* 1:410–421, 1988.

Geiser, Conetta, Limacher, Stockton, Oliver, Jones, "A Second-generation computer-based edge detection algorithm for short-axis. two-dimensional echocardiographic images: Accuracy and improvement in interobserver variability," *J. Am. Soc. Echocardiogr.,* 3(2):79–90, 1990.

Geiser and Wilson, "Automatic center point determination in 2-dimensional short-axis echocardiographic images," *Pattern Recognition,* 25:893–900, 1992.

Geiser, Buss, Wible, Cunningham, Webb, Wilson, Yang, "Evidence for a Relation between Inspired Gas Mixture and the Left Ventricular Contrast Achieved with Albunex® in a Canine Model," *Clin. Cardiol.,* 289–95, 1–996.

Geiser, Wilson, Wang, Conetta, Murphy, Hutson, "Autonomous epicardial and endocardial boundary detection in echocardiographic short-axis images," *J. Am. Soc. Echocardiography,* 11(4):338–348, 1998.

Geny, Mettauer, Muan, Bischoff, Epailly, Piquard, Eisenmann, Haberey, "Safety and Efficacy of a New Transpulmonary Echo Contrast Agent in Echocardiographic Studies in Patients," *J. Am. Col. Cardiol.,* 22(4):1193–1198, 1993.

Gordon and Rangayan, "Feature Enhancement of Film Mammograms Using Fixed and Adaptive Neighborhoods," *Appl. Opt.,* 23(4):560–564, 1984.

Grube, Nitsch, Backs, Simon, "Automatic border extraction from 2-D echocardiograms," *Circulation,* 68:330, 1983.

Grube, J. E., Backs, A., Backs, B., Luderitz, B., "Automatisch konturerkennung im zweidimensionalen echokardiogramm—untersuchungen an einem aligemeinen patientenkollcktiv," *Z. Kardiol.,* 1:410–421, 1988.

Halmann, Beyar, Rinkevich, Shapiro, Sideman, Markeiwicz, Meltzer, Reisner, "Digital Subtraction Myocardial Contrast Echocardiography: Design and Application of a New Analysis Program for Myocardial Perfusion Imaging," *J. Am. Soc. Echocardiol.,* 355–362, 1994.

Han, C. Y., Lin, K. N., Wee, W. G., Mintz, R. M., Porembka, D. T., "Knowledge-based image analysis for automated boundary extraction of transesophageal echocardiographic left-ventricular images, *IEEE Trans. Med. Imag.,* 10:602–610, 1991.

Horn and Schunk, "Determining the optical flow," *Artificial Intell.,* 17:185–203, 1981.

Hunter, I. A., Soraghan, J. J., McDonagh, T., "Fully automatic left ventricular boundary extraction in echocardiographic images," *IEEE Computers in Cardiology,* pp. 741–744, 1995.

Kaul, "Clirlical Applications of Myocardial Contrast Echocardiography," *Am. J. Cardiol.,* 46H-5H, 1992.

Kaul, "Myocardial Contrast Echocardiography in Coronary Artery Disease: Potential Applications Using Venous Injections of Contrast," *Am. J. Cardiol.,* 61D-68D, 1995.

Kaul, "Myocardial Perfusion and Other Applications of Contrast Echocardiography," In: *Marcus Cardiac Imaging, A Companion to Braunwald's Heart Disease,* Skorton, D., Schelbert, H., Wolf, G., Brundage, B., Braunwald, E., editors, Pennsylvania: W. B. Saunders Company, pp. 4–35, 1996.

Kerber, Richard E., Ed., *Applications of Automatic Edge Detection and Image Enhancement Techniques to Two-Dimensional Echocardiography and Coronary Disease,* Echocardiography in Coronary Artery Disease, E. A Geiser (Futura Publishing Company, Mount Kisco, N.Y., 1988.

Luce and Hopewell, "Critical care medicine," In: *Cecil Textbook of Medicine,* Wyngaarden J. B., Smith L. H., Jr., Bennett, J. C., eds., W. B. Saunders Co., Philadelphia, Pa., pp. 2370–80, 1992.

Mailoux, Bleau, Bertrand, Petitclerc, "Computer analysis of heart motion from two-dimensional echocardiograms," *IEEE Trans. Biomed. Eng.,* BME-34, 5:356–364, 1987.

Mailoux, Langlois, Simard, Bertrand, "Restoration of the velocity field of the heart from two-dimensional echocardiograms," *IEEE Trans. Med. Imag.,* 8(2):143–153, 1989.

Manber, In: *Introduction to Algorithms,* Reading, Mass., Addison-Welsey, 190–197, 1989.

Melton and Skorton, "Rational-Gain-Compensation for Attenuation in Ultrasonic Cardiac Imaging," *IEEE Ultrasonics Symposium,* 607–611, 1981.

Monaghan, Metcalfe, Odunlami, Waaler, Jewitt, "Digital radio frequency echocardiography in the detection of myocardial contrast following intravenous administration of Albunex," *Eur. Heart J.,* 14(9):1200–1209, 1993.

Mulvagh, Foley, Aeschbacher, Klarich, Seward, "Second Harmonic Imaging of an Intravenously Administered Echocardiographic Contrast Agent," *J. Am. Col. Cardiol.,* 1519–25, 1996.

Padial, Chen, Vuille, Guerrero, Weyman, Picard, "Pulsatile pressure affects the disappearance of echocardiographic contrast agents," *J. Am. Soc. Echocardiol.,* 8(3):285–92, 1995.

Panda and Dkibitzka, "Statistical analysis of some edge operators," *Comput. Graphics Image Proc.,* 11:313–348, 1979.

Parker, Hill, Taylor, Cootes, Jin, Gibson, "Application of point distribution models to the automated analysis of echocardiograms," *Computers Cardiol.,* pp. 25–28, 1994.

Perez, Waggoner, Barzilai, et. al., "On-line assessment of ventricular function by automatic boundary detection and ultrasound imaging," *J. Am. Coll. Cardiol.,* 19:313–320, 1992.

Prasad and Srinivasan, "An image processing method for cardiac motion analysis," *IEEE Trans. Biomed. Eng.,* BME-34(3):244–247, 1987.

Rangarajan, Chui, Bookstein, "The softassign Procrustes matching algorithm" In: *Information Processing in Medical Imaging,* J. Duncan and G. Gindi (Ed.), Lecture Notes in Computer Science, Vol. 1230, 15th International Conference, Springer-Verlag, pp. 29–42, 1997.

Rao, In: *Linear Statistical Inference and its Application,* John Wiley, NY, p. 197, 1965.

Sanders, Cheirif, Desir, Zoghbi, Hoyt, Schulz, Quinones, "Contrast opacification of left ventricular myocardium following intravenous administration of sonicated albumin microspheres," *Am. J Heart,* 122(6):1660–5, 1991.

Scheaffer and McClave, In: *Probability and Statistics for Engineers,* Boston, Duxbury, 346–351, 1986.

Schiller, Shah, Crawford, DeMaria, Devereux, Feigenbaum, Gutgesell, Reichek, Sahn, Schnittger, Silverman, Tajik, "Recommendations for Quantitation of the Left Ventricle by Two-Dimensional Echocardiography," *J. Am. Soc. Echocardiol.,* 358–67, 1989.

Stuhlmuller, Skorton, Burns, Melton and Vandenberg, "Reproducibility of quantitative backscatter echocardiographic imaging in normal subjects," *Am. J. Cardiol.,* 69(5):542–546, 1992.

Torres, L. Sangra, E., Gasull, A., Sallent, S., "A new algorithm for automatic border detection of two-dimensional echocardiographic images. Timevaring image processing and moving object recognition," 2:181–188, 1990.

Uchiyama, T., Kajiwara, N., Kobayashi, Y., Ishi, H., "Comparison of manual and computer-assisted automatic measurements of wall thickness of the left ventricle in two-dimensional echocardiography, *Jap. Circ. J.*, 58:49–56, 1994.

Van der Geest, R. J., Jansen E., Buller, V. G. M., Reiber, J. H. C., "Automated detection of left ventricular epi- and endocardial contours in short-axis MR images," *IEEE Computers in Cardiology*, pp. 33–36, 1994.

Van Liew and Burkard, "Behavior of slowly-permeating gas used for ultrasonic imaging contrast," *Invest. Radiol.*, 30:315–21, 1995.

Vandenberg, Rath, Stuhlmuller. Mellon, Skorton, "Estimation of left ventricular cavity area with an on-line, semi-automated echocardiographic edge detection system," *Circulation*, 86:159–166, 1992.

Vanderberg, B. F., Rath, L. S., Stuhlmuller, P., Melton, H. E., Jr., Skorton, D. J., "Estimation of left ventricular cavity area with an on-line, semiautomated echocardiographic edge detection system, *Circulation*, 86:159–166, 1992.

Vuille, Nidorf, Morrissey, Newell, Weyman, Picard, "Effect of static pressure on the disappearance rate of specific echocardiographic contrast agents," *J. Am. Soc. Echocardiogr.*, 7:347–354, 1994.

Weyman, A. E., Franklin T. D., Hogan R. D., et al., "Importance of Temporal Heterogencity in Assessing the Contraction Abnormalities Associated with Acute Myocardial Ischemia," *Circulation*, 70:102–112, 1984.

Weyman, Arthur E., "Principals in Practice of Echocardiography," 2nd ed., Lea and Febiger, Philadelphia, Pa., 1994.

Wible, J. H., Jr., Wojdyla, J. K., Scherrer, D. E., Adams, M. D., Brandenburger, G. H., "Improving the sonographic contrast produced by Albunex™ during the inhalation of gases other than air," *Acad. Radiol.*, 3 Suppl. 2:S317–S319, 1996.

Wliencek, Feinstein, Walker, Aronson, "Pitfalls in quantitative contrast echocardiography: The steps to quantitation of perf-asion," *J. Am. Soc. Echocardiogr.*, 4:395–416, 1993.

Wilson and Geiser, "Automatic center point determination in two-dimensional short-axis echocardiographic images," *Pattern Recog.*, 25(9):893–900, 1992.

Wilson, Geiser, Li, "Feature extraction in two-dimensional short-axis echocardiographic images," *J Math. Imag. and Vision*, 3:285–298, 1993.

Wilson, Geiser, Conetta, Murphy, Wang, "An automatic algorithm for analysis of 2-D echocardiographic short-axis images: a brief overview," *IEEE Transac. Biomed. Eng.*, 222–231, 1996.

Wray, Quinones, Zoghbi, Cheirif, "Relation of mean pixel intensity to concentration of sonicated albumin microspheres: effects of ultrasound system settings," *Clin. Cardiol.*, Suppl. V:V-23–28, 1991. A. 141875(3_MWOI!DOC)

Zhang and Geiser, "An effective algorithm for extracting serial endocardial borders from two-dimensional echocardiograms." *IEEE Trans. Biomed. Eng.*, BME-31(6):441–447, 1984.

What is claimed is:

1. A method for automatically analyzing a long-axis image of a heart, said method comprising the steps of:
   (a) generating an image frame of the myocardium, interventricular septum, and mitral valve annulus of said heart, said image frame comprising a plurality of rows and a plurality of columns of pixels in a digital format;
   (b) determining an approximate position of said interventricular septum from said diagnostic image comprising:
       (i) passing a filter through the image to determine a maximum mean pixel intensity, wherein said maximum is a first approximate position of said interventricular septum;
       (ii) defining a second approximate position of said interventricular septum with a series of straight line filters;
       (iii) obtaining a best fit line through the second approximate position from the upper portion of said series of straight line filters;
   (c) determining an approximate position of a medial border of said mitral valve annulus by passing a right-angle filter down the best fit line determined from step (b)(iii) until a maximum mean pixel intensity is determined, wherein said maximum is indicative of the approximate position of said mitral valve annulus;
   (d) defining a registration point as the point at which said best fit line intersects the approximate position of said mitral valve annulus;
   (e) locating one or more regions of the myocardium in relation to said registration point; and
   (f) calculating the mean pixel intensity in each of the regions of the myocardium, wherein said mean pixel intensity provides an analysis of the long axis image of the heart.

2. The method of claim 1, wherein said image is generated by ultrasound, X-rays, or magnetic resonance imaging.

3. The method of claim 2, wherein said X-rays are planar or tomographic.

4. The method of claim 2, wherein said image is generated by ultrasound.

5. The method of claim 1, wherein said filter is a large mean, first derivative, or second derivative filter.

6. The method of claim 1, wherein said series of straight line filters comprises one or more Laplacian or first derivative filters.

7. The method of claim 6, wherein said series of straight line filters comprises about 32 Laplacian filters.

8. The method of claim 1, wherein said regions of the myocardium are selected manually for densitometry over a coronary perfusion bed.

9. The method of claim 1, wherein said regions of the myocardium are selected automatically for densitometry.

10. A method for determining the optical density of a digital image of an apical view of a heart, said method comprising the steps of:
    (a) obtaining a control frame from a baseline period prior to injecting a contrast agent;
    (b) determining a first registration point in said image;
    (c) locating one or more regions of a myocardium in relation to the registration point on said control frame;
    (d) calculating the mean pixel intensity of said one or more regions of the myocardium;
    (e) injecting the contrast agent and obtaining a sequence of frames;
    (f) determining a second registration point in one or more of said frames of said sequence;

(g) locating one or more regions of the myocardium on one or more of said frames corresponding to the regions of a control frame;

(h) calculating the mean pixel intensity of said one or more regions of the myocardium in one or more of said frames of said sequence; and (i) obtaining a time-mean pixel intensity curve by comparing the mean pixel intensity for said frames following injection of the contrast agent to the control frame, wherein said time-mean pixel intensity curve determines the optical density of the digital image in a selected region of the apical long axis view of the heart.

11. The method of claim 10, further comprising the step of determining whether perfusion is present in a region by comparing a pre-contrast mean pixel intensity to that calculated after peripheral injection.

12. The method of claim 10, wherein said contrast agent is Albunex® or Optison®.

13. A method for automatically locating an approximate position of the interventricular septum of a heart in a long-axis image, said method comprising the steps of:

(a) generating an image frame of said heart, said image frame comprising a plurality of rows and a plurality of columns of pixels in a digital format; and (b) passing a filter through the image to determine a maximum mean pixel intensity, wherein said maximum is an approximate position of the interventricular septum in said image.

14. The method of claim 13 further comprising passing a series of straight line filters through said image.

15. A method of automatically locating an approximate position of a medial border of a mitral valve annulus in a long-axis diagnostic image of a heart, said method comprising the steps of:

(a) generating an image frame of the interventricular septum and mitral valve annulus of said heart, said image frame comprising a plurality of rows and a plurality of pixels in a digital format;

(b) determining an approximate position of said septum from said diagnostic image comprising:

(i) passing a filter through the image to determine a maximum mean pixel intensity, wherein said maximum is a first approximate position of said interventricular septum;

(ii) defining a second approximate position of said interventricular septum with a series of straight line filters;

(iii) obtaining a best fit line through the second approximate positions from the upper portion of said series of straight line filters; and (c) determining an approximate position of a medial border of said mitral valve annulus by passing a right-angle filter down the best fit line determined from step (b)(iii) until a maximum mean pixel intensity is determined, wherein said maximum is indicative of the approximate position of said mitral valve annulus.

16. A method of screening a compound for use as a contrast agent in echocardiography, said method comprising the steps of:

(a) obtaining, from a baseline period prior to injecting said compound, a control frame of a digital image of an apical long-axis view of a heart;

(b) determining a first registration point in said image;

(c) locating one or more regions of a myocardium in relation to the registration point on said control frame;

(d) calculating the mean pixel intensity of said one or more regions of the myocardium;

(e) injecting said compound and obtaining a sequence of frames;

(f) determining a second registration point in said frames;

(g) locating one or more regions of the myocardium on said frame corresponding to the regions of the control frame;

(h) calculating the mean pixel intensity of said one or more regions of the myocardium in said frame; and (i) obtaining a time-mean pixel intensity curve by comparing the mean pixel intensity for said frame following injection of the contrast agent to the control frame, wherein an increase in the mean pixel intensity in the regions of the myocardium in said frame following injection of the contrast agent over the control frame is indicative of injection of a contrast agent.

* * * * *